(12) United States Patent
Evenstad et al.

(10) Patent No.: US 7,473,291 B2
(45) Date of Patent: *Jan. 6, 2009

(54) INERTIAL GAS-LIQUID SEPARATOR WITH VARIABLE FLOW ACTUATOR

(75) Inventors: Karl G. Evenstad, Westby, WI (US); Eric J. Rego, Verona, WI (US); Brian W. Schwandt, Fort Atkinson, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 624 days.

This patent is subject to a terminal disclaimer.

(21) Appl. No.: 11/168,688

(22) Filed: Jun. 28, 2005

(65) Prior Publication Data

US 2006/0062699 A1 Mar. 23, 2006

Related U.S. Application Data

(63) Continuation-in-part of application No. 10/946,603, filed on Sep. 21, 2004, now Pat. No. 7,238,216.

(51) Int. Cl.
*B01D 45/04* (2006.01)
(52) U.S. Cl. .............................. 55/416; 55/329; 55/332; 55/465; 55/468; 55/DIG. 14
(58) Field of Classification Search .................... 55/329, 55/332, 418, 419, 420, 468, DIG. 19, DIG. 14; 96/402; 422/105, 110, 112
See application file for complete search history.

(56) References Cited

U.S. PATENT DOCUMENTS

| | | | |
|---|---|---|---|
| 1,548,288 A | 8/1925 | Smith | |
| 3,201,925 A | 8/1965 | Shada | |
| 3,433,231 A | 3/1969 | Siragusa | |
| 3,923,480 A | 12/1975 | Visch | |
| 4,012,209 A | 3/1977 | McDowell et al. | |
| 4,014,673 A | 3/1977 | Kinnison | |
| 4,401,093 A | 8/1983 | Gates, Jr. et al. | |
| 4,993,517 A | 2/1991 | Leipelt et al. | |
| 5,129,371 A | 7/1992 | Rosalik, Jr. | |
| 5,460,147 A | 10/1995 | Bohl | |
| 5,562,087 A * | 10/1996 | Wright | 123/572 |
| 5,564,401 A | 10/1996 | Dickson | |
| 6,073,618 A | 6/2000 | Sanders et al. | |
| 6,074,448 A | 6/2000 | Schulz et al. | |
| 6,247,463 B1 | 6/2001 | Fedorowicz et al. | |

(Continued)

FOREIGN PATENT DOCUMENTS

CH 127029 5/1927

(Continued)

OTHER PUBLICATIONS

Highly Efficient Oil Separation Systems for Minimised Oil Carry Over, MTZ Apr. 2008, vol. 69, pp. 32-37.

*Primary Examiner*—Duane S Smith
*Assistant Examiner*—Sonji Turner
(74) *Attorney, Agent, or Firm*—Andrus, Sceales, Starke & Sawall, LLP; J. Bruce Schelkopf

(57) ABSTRACT

An inertial gas-liquid separator has a variable flow actuator movable to open and close a variable number of accelerating flow nozzles.

46 Claims, 22 Drawing Sheets

U.S. PATENT DOCUMENTS

| | | |
|---|---|---|
| 6,279,556 B1 | 8/2001 | Busen et al. |
| 6,290,738 B1 | 9/2001 | Holm |
| 6,293,268 B1 | 9/2001 | Mammarella |
| 6,354,283 B1 | 3/2002 | Hawkins et al. |
| 6,402,798 B1 | 6/2002 | Kallsen et al. |
| 6,418,918 B2 | 7/2002 | Mammarella |
| 6,478,018 B2 | 11/2002 | Fedorowicz et al. |
| 6,478,019 B2 | 11/2002 | Fedorowicz et al. |
| 6,505,615 B2 | 1/2003 | Pietschner |
| 6,533,712 B1 | 3/2003 | Miller et al. |
| 6,568,540 B1 | 5/2003 | Holzmann et al. |
| 6,576,045 B2 | 6/2003 | Liu et al. |
| 6,601,385 B2 | 8/2003 | Verdegan et al. |
| 6,626,163 B1 | 9/2003 | Busen et al. |
| 6,684,864 B1 | 2/2004 | Busen et al. |
| 6,797,040 B2 | 9/2004 | Lenzig |
| 6,973,925 B2 | 12/2005 | Sauter et al. |
| 7,080,636 B2 | 7/2006 | Knaus et al. |
| 7,152,589 B2 | 12/2006 | Ekeroth et al. |
| 7,156,901 B2 | 1/2007 | Hallgren et al. |
| 7,238,216 B2 * | 7/2007 | Malgorn et al. ............... 55/418 |
| 2005/0000572 A1 | 1/2005 | Muller |
| 2006/0059875 A1 | 3/2006 | Malgorn et al. |
| 2006/0062699 A1 | 3/2006 | Evenstad et al. |
| 2006/0081229 A1 | 4/2006 | Gronberg |
| 2006/0249128 A1 | 11/2006 | Shieh et al. |
| 2007/0062887 A1 | 3/2007 | Schwandt et al. |
| 2007/0256566 A1 | 11/2007 | Faber et al. |

FOREIGN PATENT DOCUMENTS

| | | |
|---|---|---|
| DE | 1544126 | 6/1969 |
| DE | 10051307 | 5/2002 |
| DE | 10320215 | 12/2004 |
| DE | 102005042286 | 4/2007 |
| EP | 0754840 | 1/1997 |
| EP | 1068890 | 1/2001 |
| EP | 1477641 | 11/2004 |
| FR | 1406047 | 7/1965 |
| FR | 2835764 | 8/2003 |
| FR | 2852056 | 9/2004 |
| WO | WO-2006/119737 | 11/2006 |
| WO | WO-2007/028351 | 3/2007 |
| WO | WO-2007/137934 | 12/2007 |
| WO | WO-2007/138008 | 12/2007 |

* cited by examiner

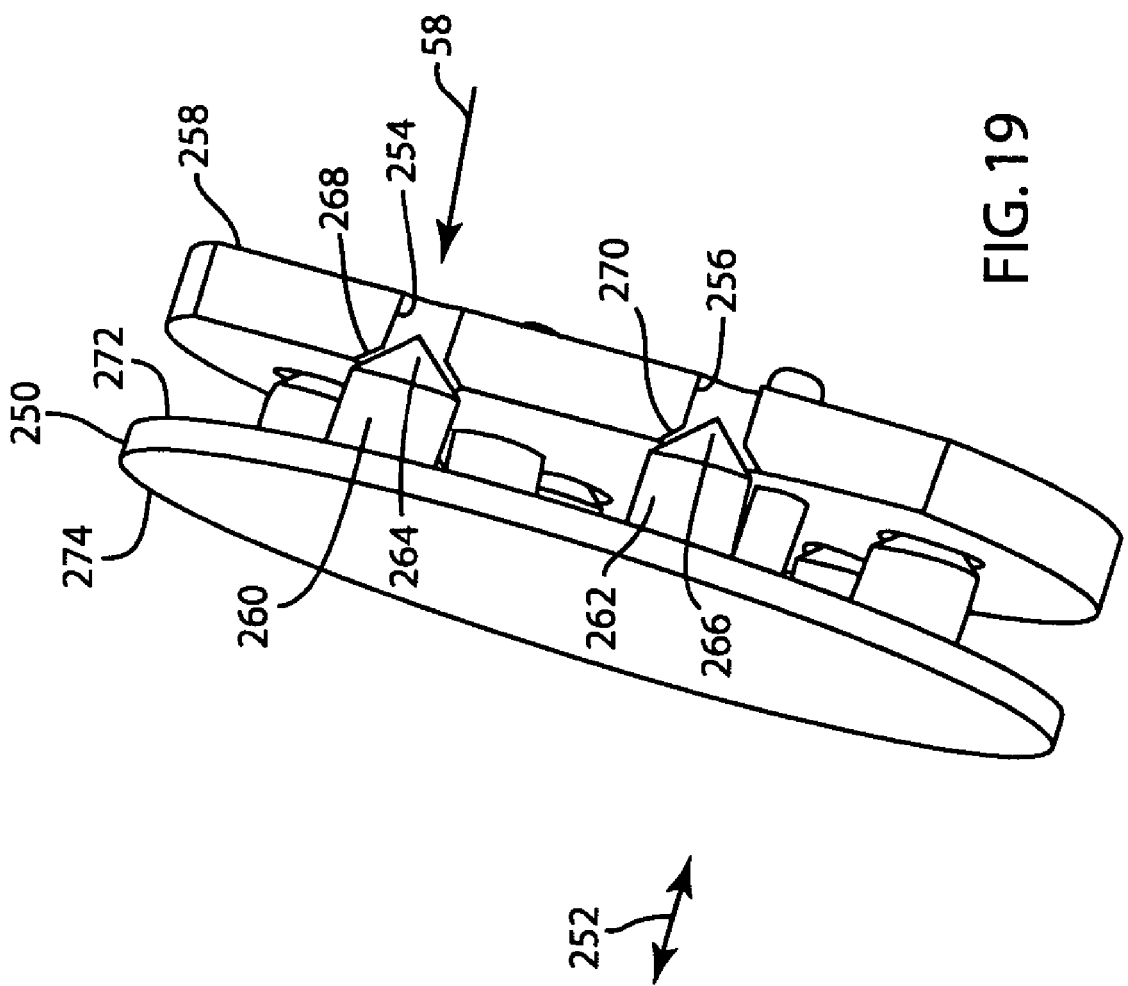

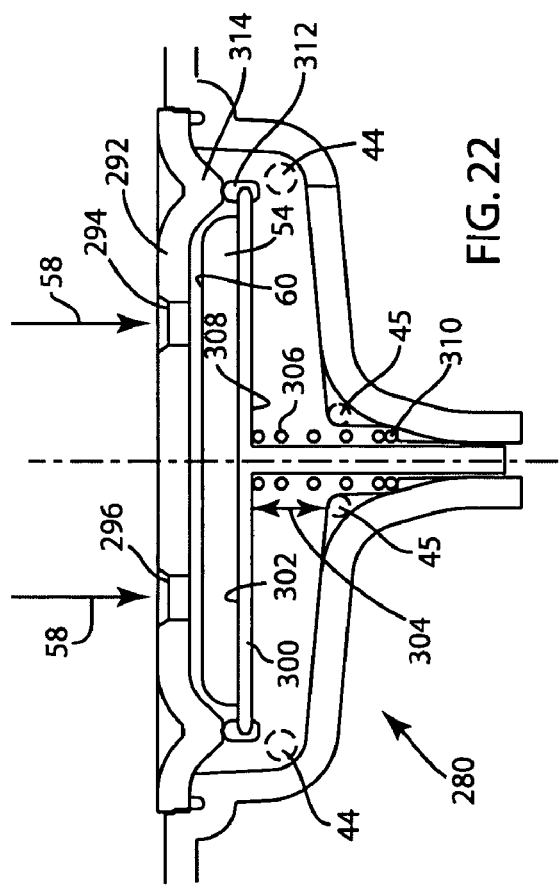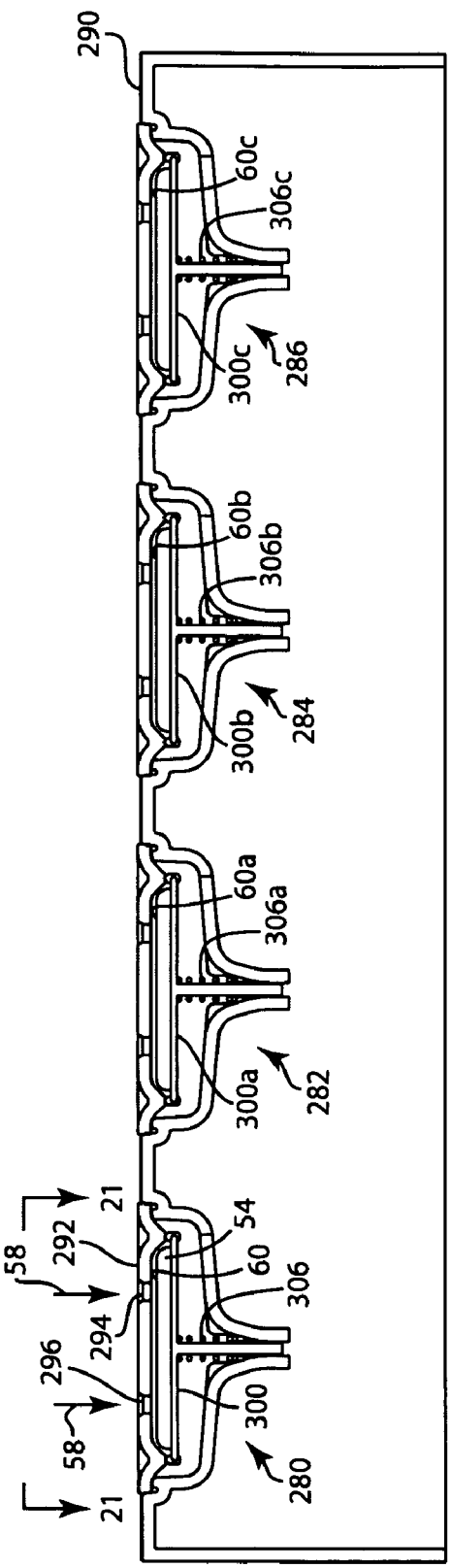

INERTIAL GAS-LIQUID SEPARATOR WITH VARIABLE FLOW ACTUATOR

CROSS-REFERENCE TO RELATED APPLICATIONS

This application is a continuation-in-part of U.S. patent application Ser. No. 10/946,603, filed Sep. 21, 2004 now U.S. Pat. No. 7,238,216.

BACKGROUND AND SUMMARY

The invention of the above noted parent application relates to inertial gas-liquid impactor separators for removing and coalescing liquid particles from a gas-liquid stream, including in engine crankcase ventilation separation applications, including closed crankcase ventilation (CCV) and open crankcase ventilation (OCV).

Inertial gas-liquid separators are known in the prior art. Liquid particles are removed from a gas-liquid stream by accelerating the stream or aerosol to high velocities through nozzles or orifices and directing same against an impactor, typically causing a sharp directional change, effecting the noted liquid separation. Such inertial impactors have various uses, including in oil separation applications for blow-by gases from the crankcase of an internal combustion engine.

The parent invention provides improvements in inertial gas-liquid impactor separators, including variable flow.

The present invention arose during continuing development efforts relating to the above noted parent invention.

BRIEF DESCRIPTION OF THE DRAWING

Parent Application

FIG. 19 is a schematic perspective view of a portion of another inertial gas-liquid impactor separator in accordance with the parent invention.

FIG. 20 is a sectional view of another embodiment of an inertial gas-liquid impactor separator in accordance with the parent invention.

FIG. 21 is a top elevation view taken along line 21-21 of FIG. 20.

FIG. 22 is an enlarged view of a portion of FIG. 20.

Present Application

Figure 23:
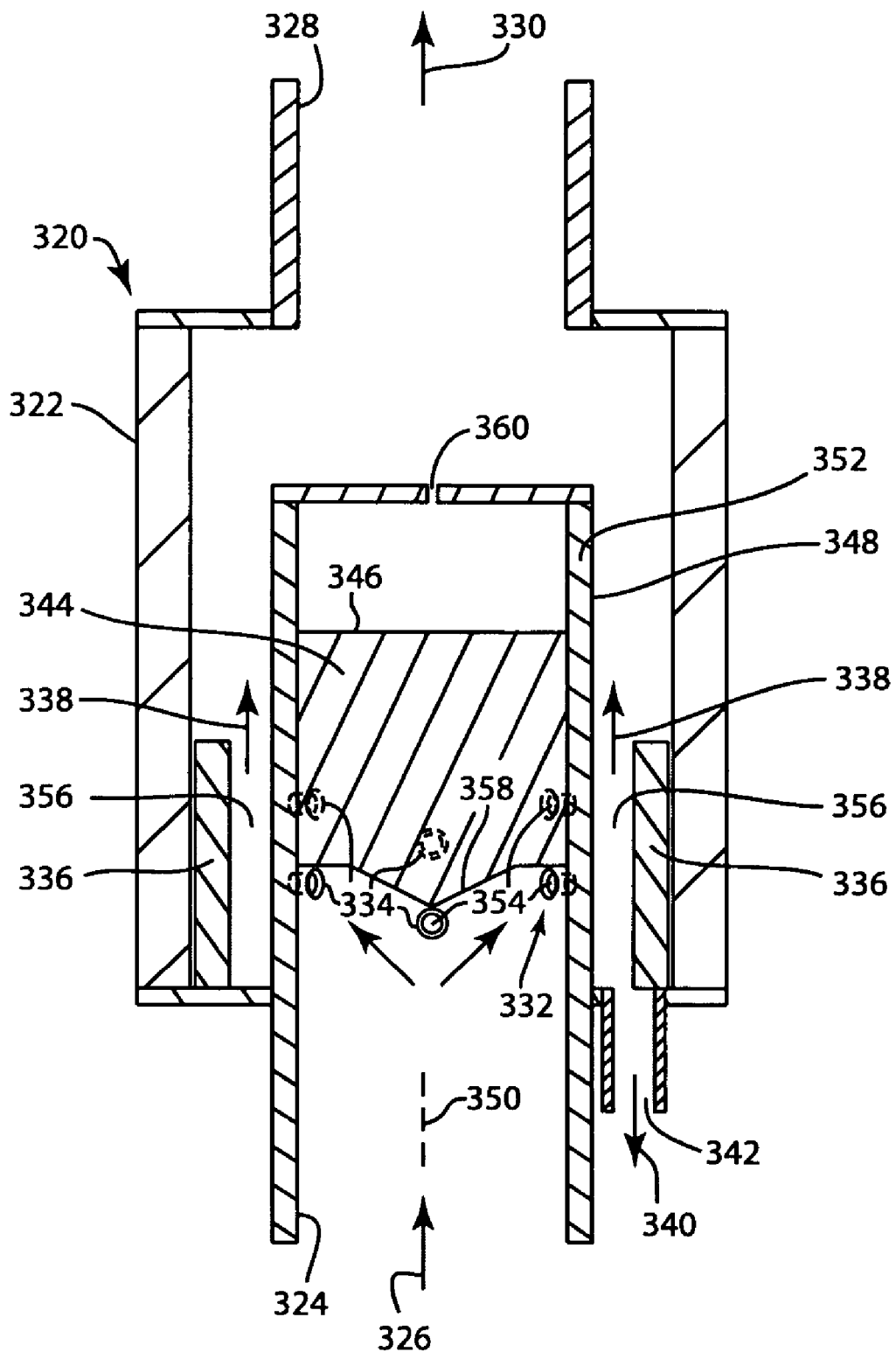

FIG. 23 is a schematic sectional view of an inertial gas-liquid separator in accordance with the present invention.

Figure 24:
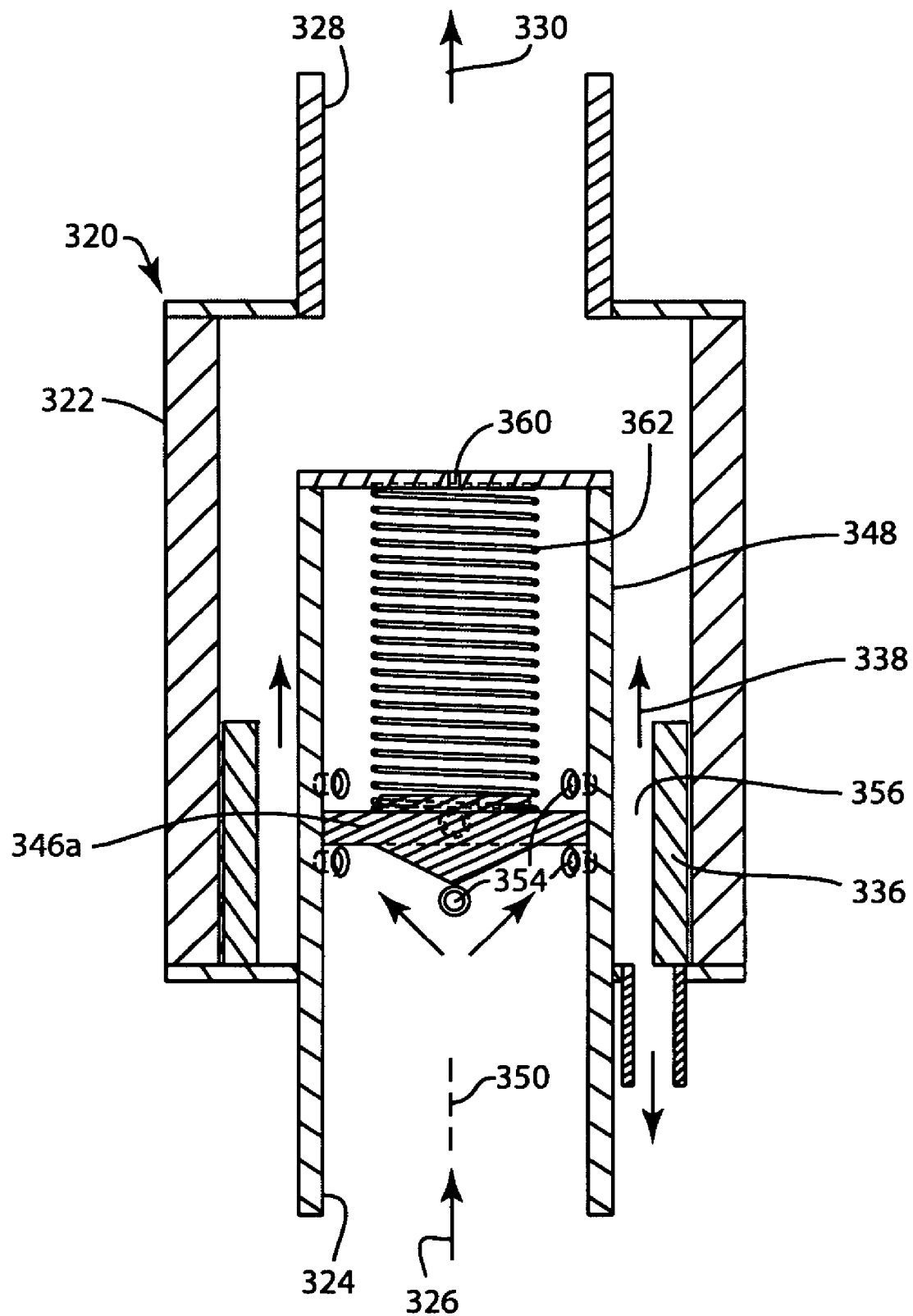

FIG. 24 is like FIG. 23 and shows another embodiment.

Figure 25:
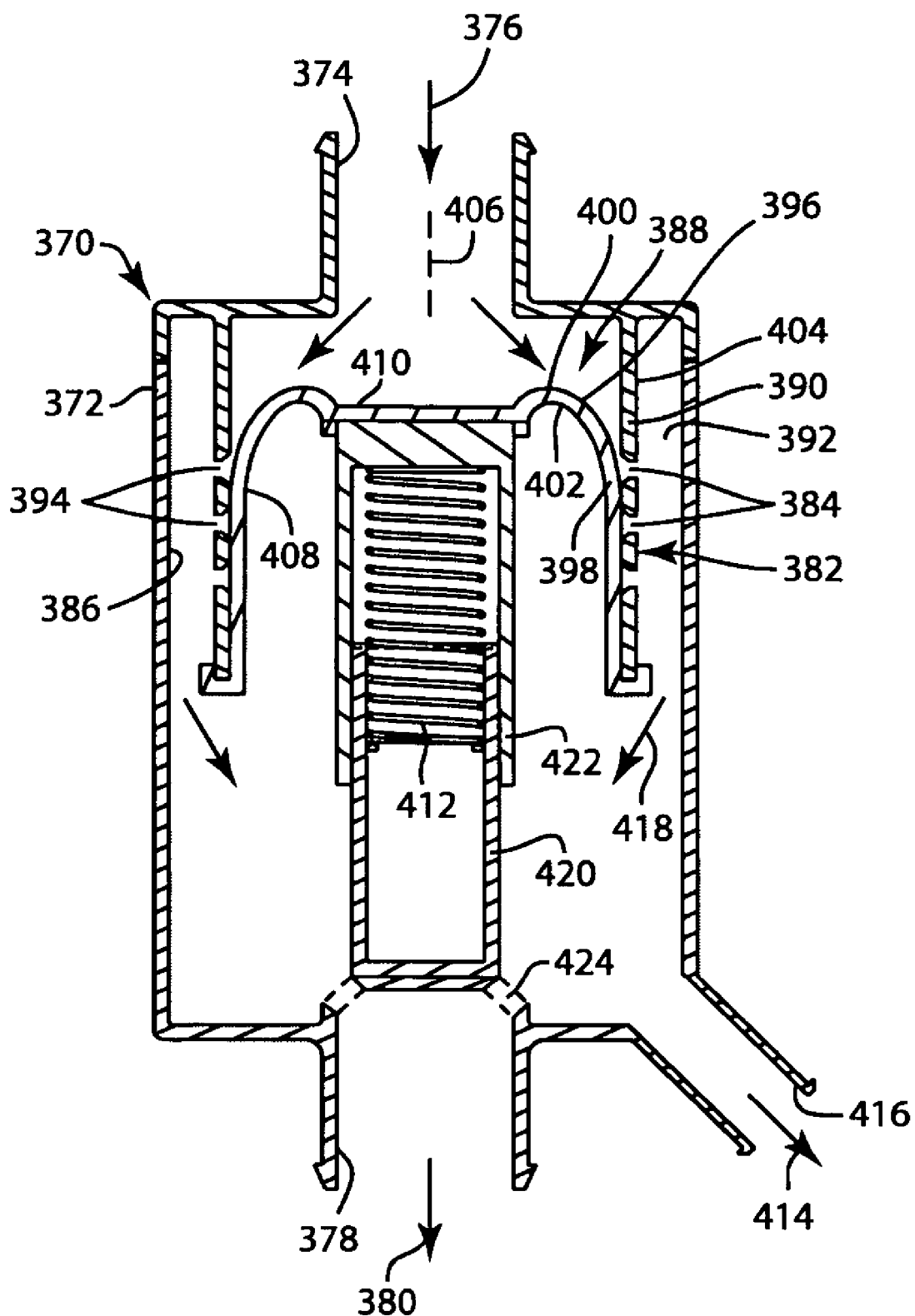

FIG. 25 is like FIG. 23 and shows another embodiment.

Figure 26:
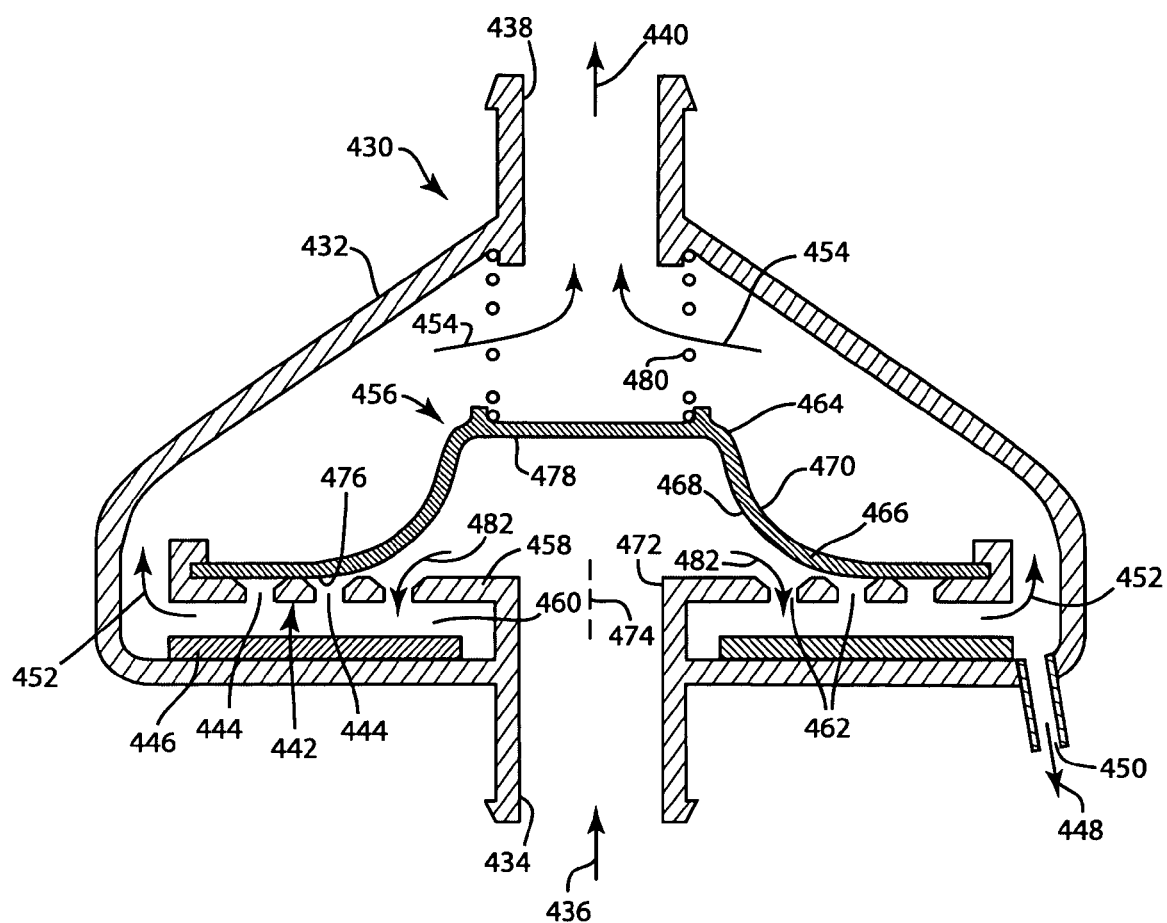

FIG. 26 is like FIG. 23 and shows another embodiment.

DETAILED DESCRIPTION

Parent Application

Figure 1:
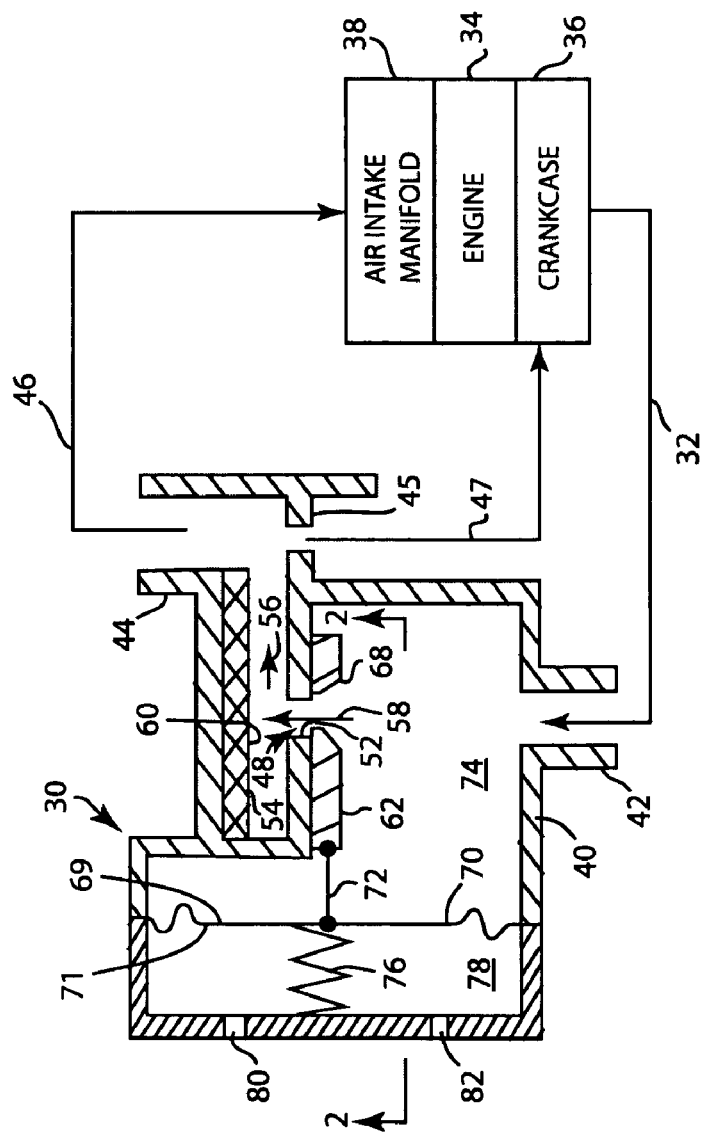
FIG. 1 is a schematic sectional illustration of an inertial gas-liquid impactor separator in accordance with the parent invention.

FIG. 1 shows an inertial gas-liquid impactor separator 30 for coalescing and removing liquid particles from a gas-liquid stream 32, shown in an exemplary crankcase ventilation separation application for an internal combustion engine 34. In such application, it is desired to vent blow-by gases from crankcase 36 of engine 34. Untreated, these gases contain particulate matter in the form of oil mist and soot. It is desirable to control the concentration of the contaminants, especially if the blow-by gases are to be recirculated back to the engine's air intake system, for example at air intake manifold 38. The oil mist droplets are generally less than 5μ in diameter, and hence are difficult to remove using conventional fibrous filter media while at the same time maintaining low flow resistance as the media collects and becomes saturated with oil and contaminants.

Separator 30 includes a housing 40 having an inlet 42 for receiving gas-liquid stream 32 from engine crankcase 36, an outlet 44 for discharging a gas stream 46 to air intake manifold 38, and a drain 45 draining separated fluid at 47 from impactor collector 54 and returning collected oil droplets at 47 to crankcase 36. Nozzle structure 48 in the housing has a plurality of nozzles provided by orifices such as 50, 52, FIGS. 1, 2, receiving the gas-liquid stream at 58 from inlet 42 and accelerating the gas-liquid stream through nozzles 50, 52. The plurality of nozzles provides a cumulative flow in parallel therethrough. An inertial impactor collector 54 in the housing is in the path of the accelerated gas-liquid stream at 58 and causes liquid particle separation by a sharp directional change as shown at 56. In the preferred embodiment, impactor collector 54 has a rough porous collection or impingement surface 60 causing liquid particle separation from the gas-liquid stream, and is like that shown in U.S. Pat. No. 6,290,738, incorporated herein by reference. Nozzle orifices 50, 52 may have a venturi or frustoconical shape as in the incorporated '738 patent.

Figure 2:
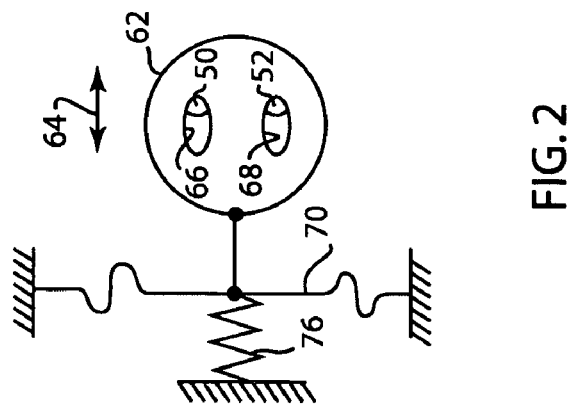
FIG. 2 is a sectional view taken along line 2-2 of FIG. 1.

A variable flow actuator 62 varies the cumulative flow through the plurality of nozzles in response to a given parameter. In one desirable embodiment, cumulative flow velocity is varied, though other flow characteristics may be varied. The gas-liquid stream flows axially along an axial flow direction at 58 through orifices 50, 52. Actuator 62 is movable along a given direction relative to the orifices to vary the noted cumulative flow. In one embodiment, actuator 62 is moveable along the noted given direction relative to the orifices to vary the total area and hence the resultant flow velocity. In FIGS. 1, 2, actuator 62 is a disk or plate movable across one or more of the orifices to change the cross-sectional area thereof transverse to axial flow direction 58. Disk 62 is movable as shown at arrow 64 left-right in FIGS. 1, 2, transversely to axial flow direction 58. In the embodiment of FIGS. 1, 2, disk 62 as a plurality of elongated slots or openings 66, 68 aligned with respective nozzle orifices 50, 52 and transversely slidable therealong to vary the size thereof available to axial flow therethrough, and hence to vary the cumulative flow area. In a further embodiment, one or more of nozzle orifices 50, 52 may be closed or opened during movement of disk 62, to thus vary the number of orifices available to axial flow therethrough, to thus vary the noted cumulative flow area. In a further embodiment, movement of actuator disk 62 varies both the size and number of the orifices, for example movement of actuator disk 62 back and forth along direction 64 may expand and restrict the orifices along a cross-sectional area thereof transverse to flow direction 58, to vary the size of the orifices, and movement of actuator disk 62 back and forth along direction 64 may open and close other of the orifices, to vary the number of orifices through which the gas-liquid stream flows.

In one embodiment, the noted parameter to which variable flow actuator 62 responds is pressure of the gas-liquid stream. Housing 40 includes a pressure sensor 70 in the form of a diaphragm or membrane coupled through link 72 to actuator 62 to actuate the latter to move left-right at 64 in FIGS. 1, 2. As the pressure of the gas-liquid stream increases, diaphragm 70 moves leftwardly in FIG. 1, which in preferred form increases the size of orifices 50, 52, etc. (increases the cross-sectional flow area thereof) and/or increases the number of orifices 50, 52, etc. open to flow therethrough. The increasing pressure of the gas-liquid flow stream in housing chamber 74 overcomes the bias spring 76 to cause leftward movement of diaphragm 70. If the gas-liquid flow pressure decreases, then biasing spring 76 moves actuator disk 62 rightwardly in FIG. 1, preferably to reduce the size and/or number of orifices 50, 52, etc. In this manner, a desired pressure differential ΔP (delta P) is maintained, eliminating the need to make compromises between minimum and maximum flow rates, engine sizes, changing conditions such as engine wear, speed, braking, etc. The variable flow actuator maximizes efficiency by adapting to different engine sizes, flow ratings, and changing conditions during engine operation, and overcomes prior trade-offs required in a fixed flow separator. In the embodiment of FIG. 1, housing chamber 78 on the opposite side of diaphragm 70 from chamber 74 is vented to atmosphere as at vent openings 80, 82, for referencing ΔP, though other reference pressures may be used.

Figure 3:
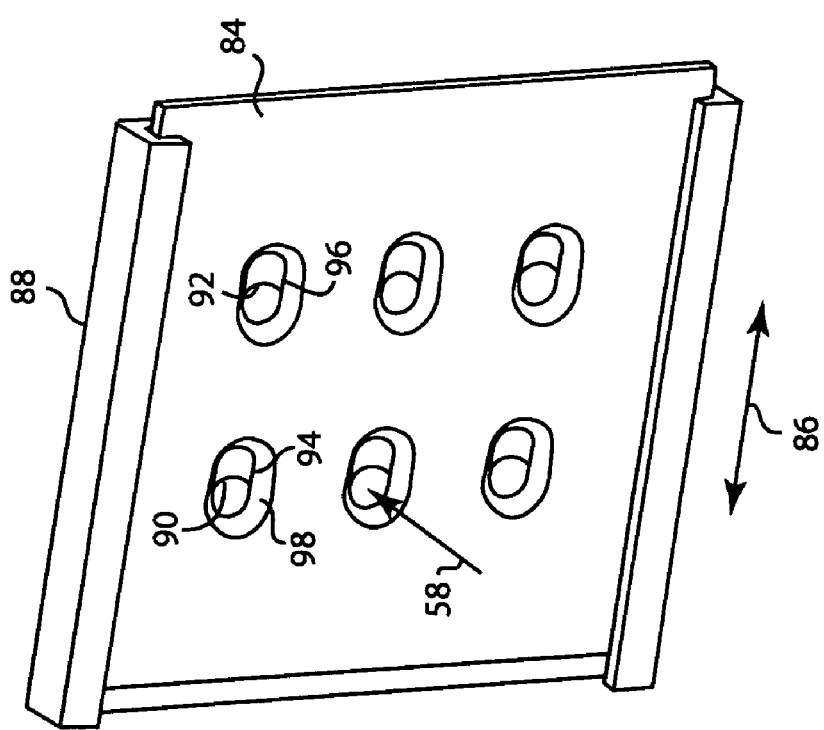
FIG. 3 is a schematic perspective view of a portion of FIG. 1 but showing another embodiment.
Figure 5:
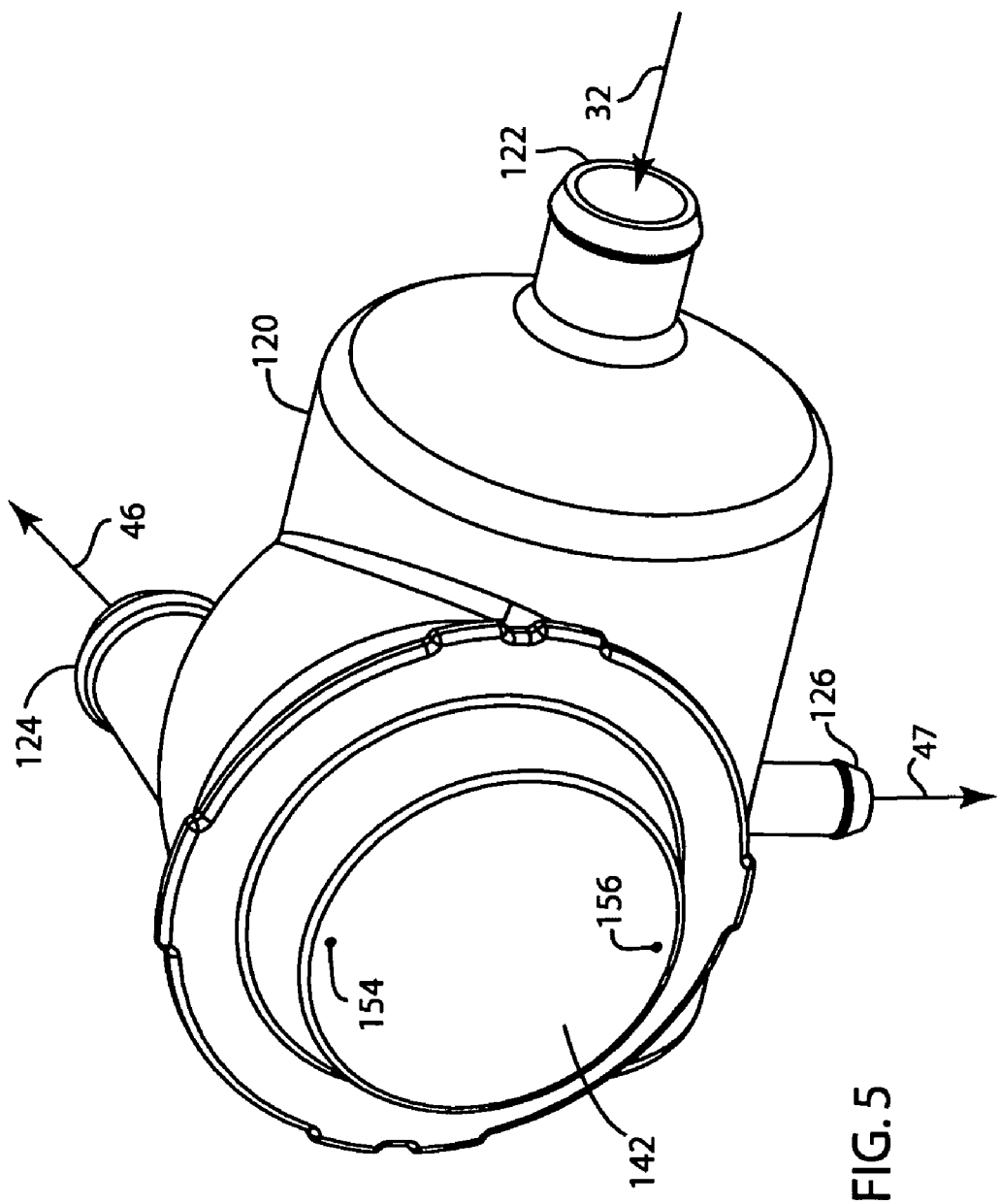
FIG. 5 is a perspective elevational view of an inertial gas-liquid impactor separator incorporating the embodiment of FIG. 4.
Figure 6:
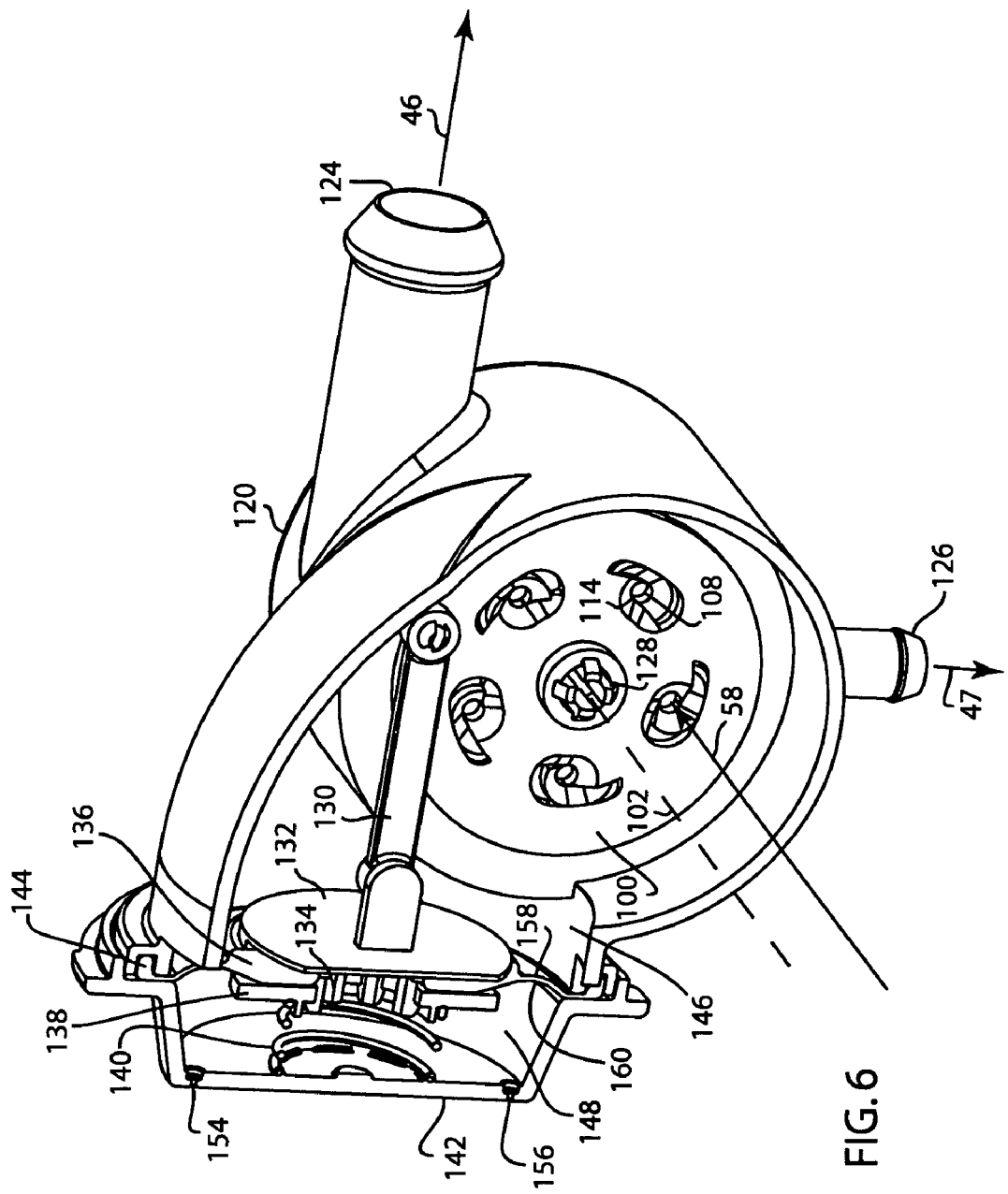
FIG. 6 is a perspective view partially broken away of the construction of FIG. 5.
Figure 7:
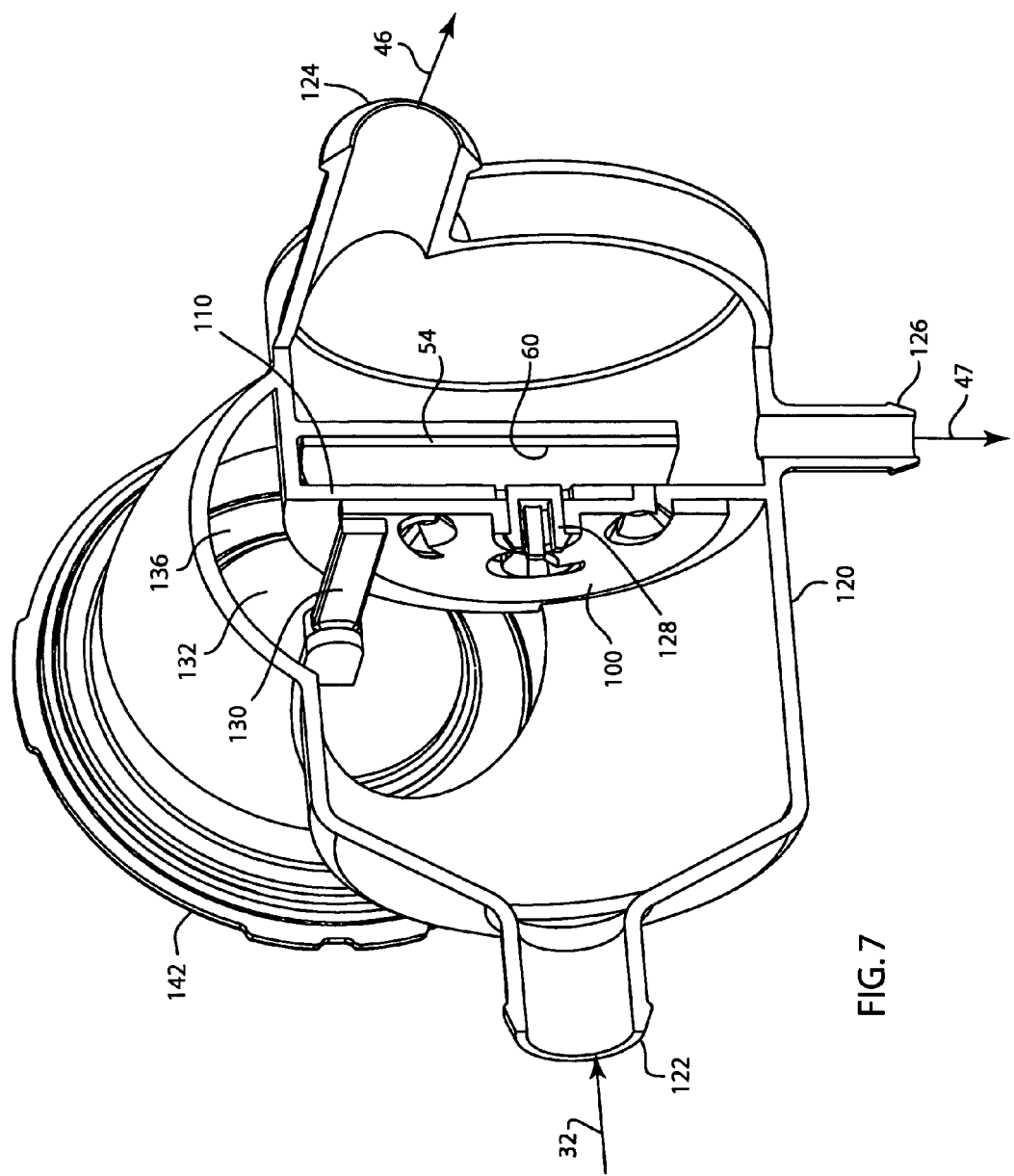
FIG. 7 is a perspective view partially broken away of the construction of FIG. 5.
Figure 8:
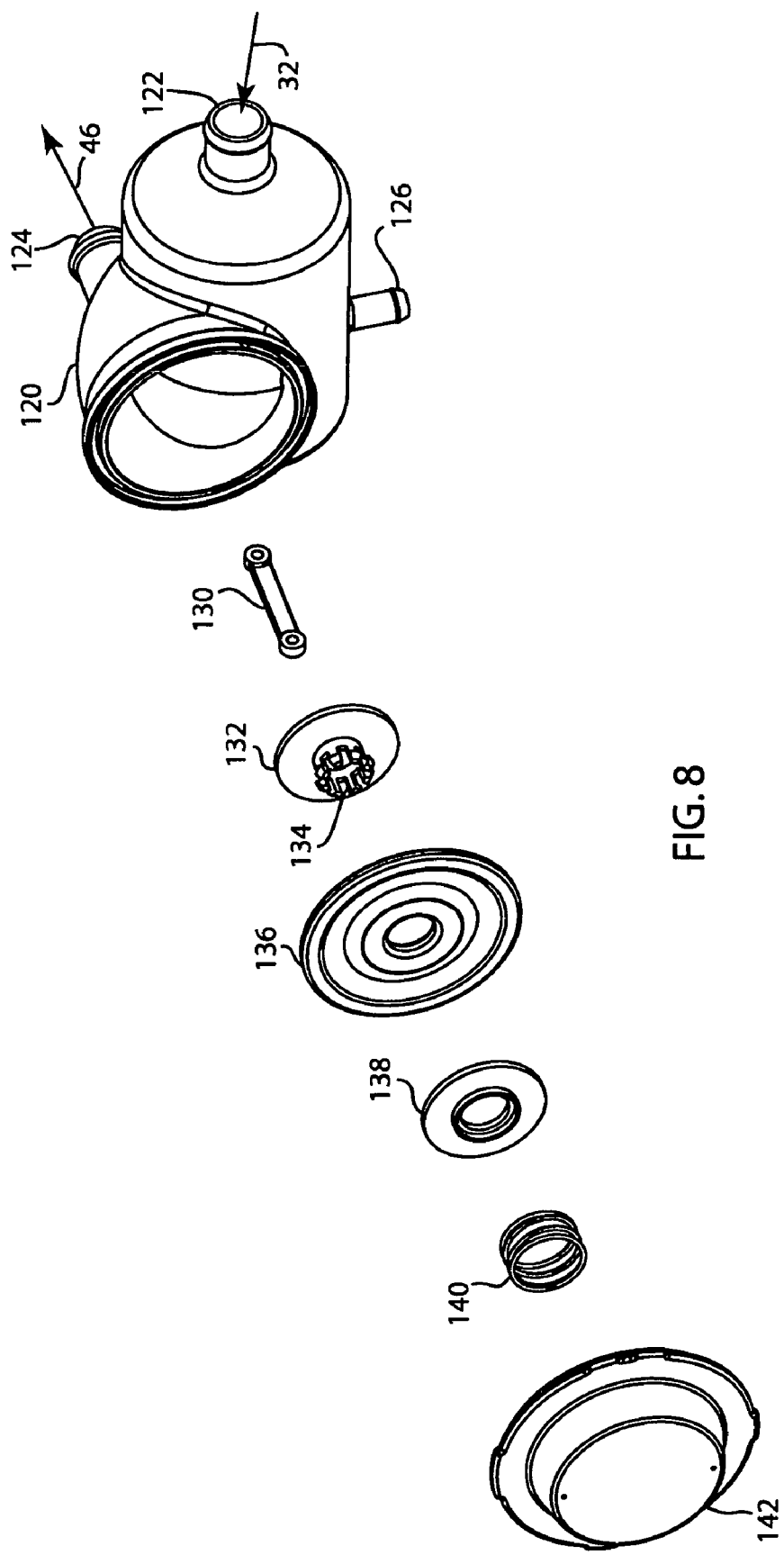
FIG. 8 is an exploded perspective view of a portion of FIG. 5.

FIG. 3 shows a further embodiment having an actuator plate or disk 84 translationally slidable left-right as shown at arrow 86 along housing 88 to vary the size of nozzle orifices such as 90, 92, as elongated slots or openings 94, 96 of disk 84 moved therealong. Slots or openings 94, 96 may have a frustoconical taper 98 to enhance the noted venturi acceleration effect. As disk 84 moves leftwardly in FIG. 3, the size of venturi orifices 90, 92 increases, i.e. leftward movement of actuator disk 84 expands the size of orifices 90, 92 along a cross-sectional area thereof transverse to axial flow direction 58, to vary the size of the orifices. Rightward movement of actuator disk 84 restricts orifices 90, 92 along the cross-sectional area thereof transverse to axial flow direction 58. Alternatively, or additionally, leftward movement of actuator disk 84 may open additional orifices, and rightward movement of actuator disk 84 may close some orifices, to vary the number of orifices through which the gas-liquid stream flows.

Figure 4:
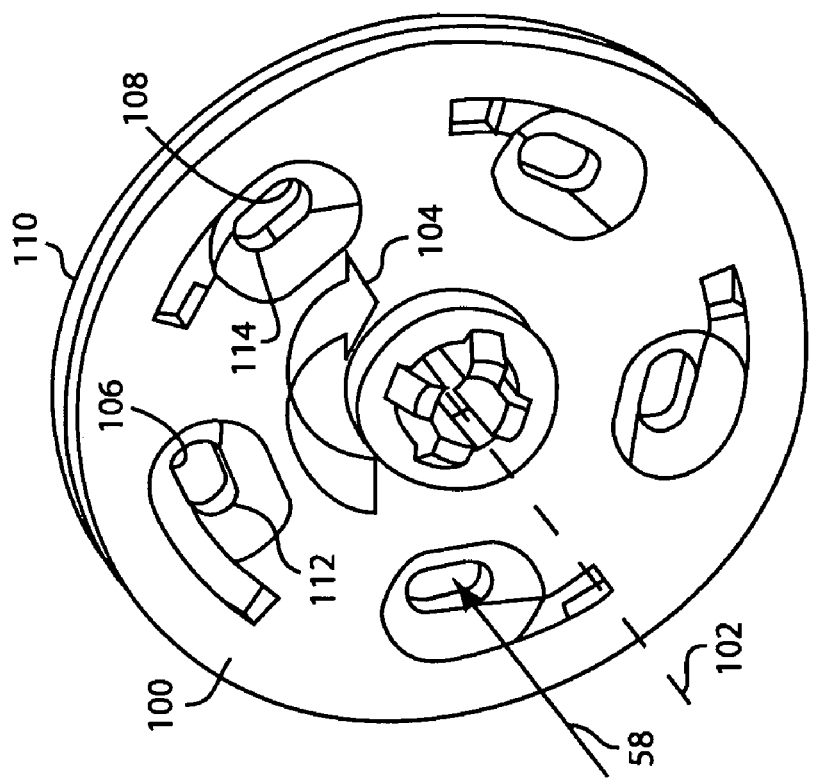
FIG. 4 is a schematic perspective view of a portion of FIG. 1 but showing another embodiment.

FIG. 4 shows another embodiment having an actuator disk 100 rotatable about a rotation axis 102 parallel to axial flow direction 58. Actuator disk 100 is rotatable clockwise as shown at arrow 104 about axis 102 to restrict and/or close one or more nozzle orifices 106, 108, etc., of housing wall 110, as slots 112, 114 in actuator disk 100 slide transversely thereacross.

FIGS. 5-10 show a preferred implementation of the embodiment of FIG. 4. Housing 120 has an inlet 122, comparable to inlet 42, FIG. 1, for receiving the gas-liquid stream 32, e.g. from crankcase 36. Housing 120 has an outlet 124, comparable to outlet 44, FIG. 1, for discharging gas stream 46, e.g. to air intake manifold 38. Housing 120 has a drain 126, comparable to drain 45, FIG. 1, draining separated fluid 47 from impactor collector 54, e.g. returning collected oil droplets at 47 to crankcase 36. Actuator disk 100 is rotationally mounted to housing spindle 128 to rotate about axis 102. Disk 100 is connected by link 130 to diaphragm plate 132 having legs 134 extending through diaphragm 136 and mounted on the opposite side to spring plate 138, such that diaphragm 136 is sandwiched between plates 132 and 138. Biasing spring 140 bears between spring plate 138 and closure cap 142 mounted to the housing and sealed thereto at perimeter 144 and providing a first chamber 146 on one side of the diaphragm, and a second chamber 148 on the other side of the diaphragm.

Figure 9:
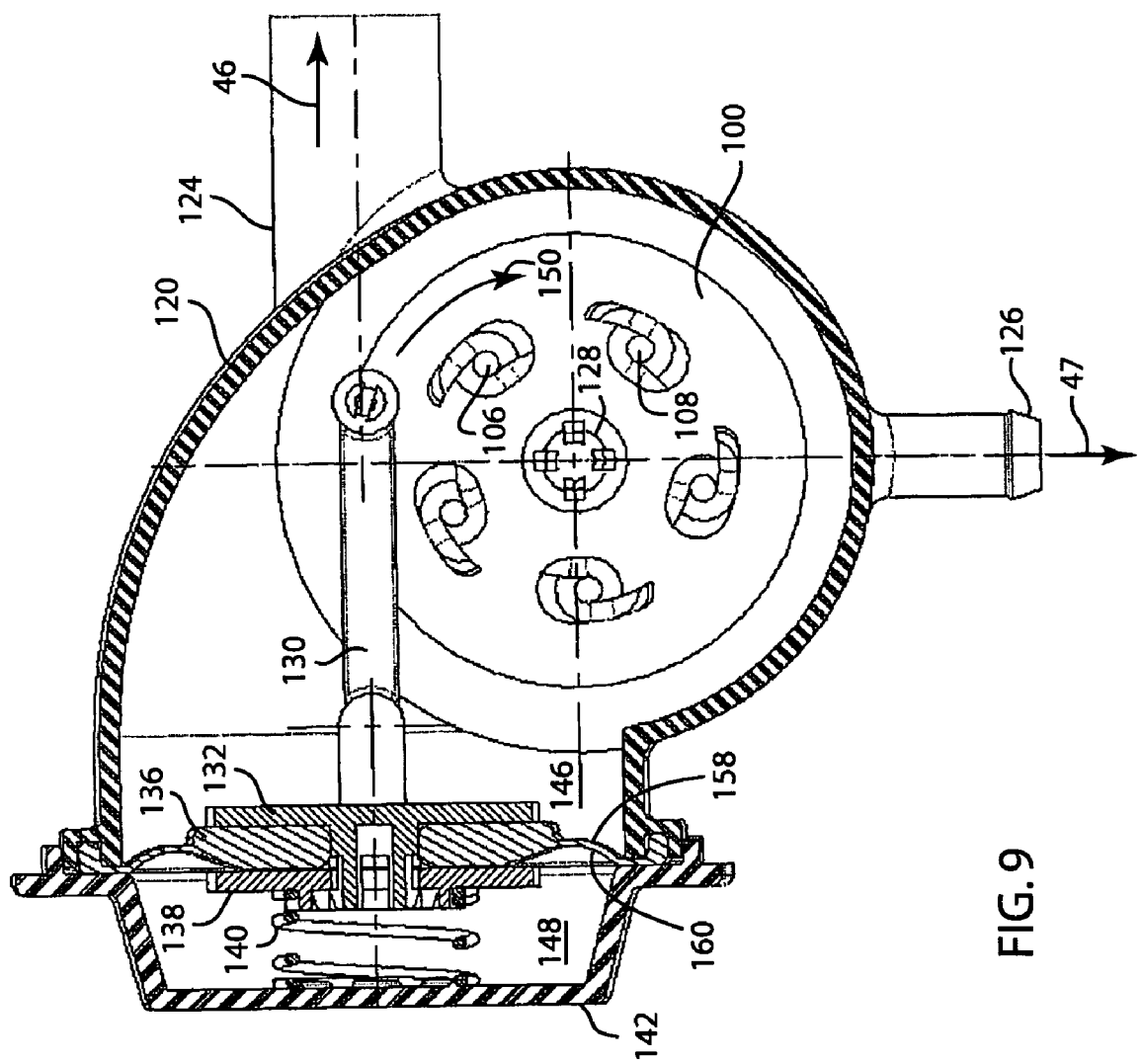
FIG. 9 is a sectional view of the construction of FIG. 5 showing a first position of the actuator.
Figure 10:
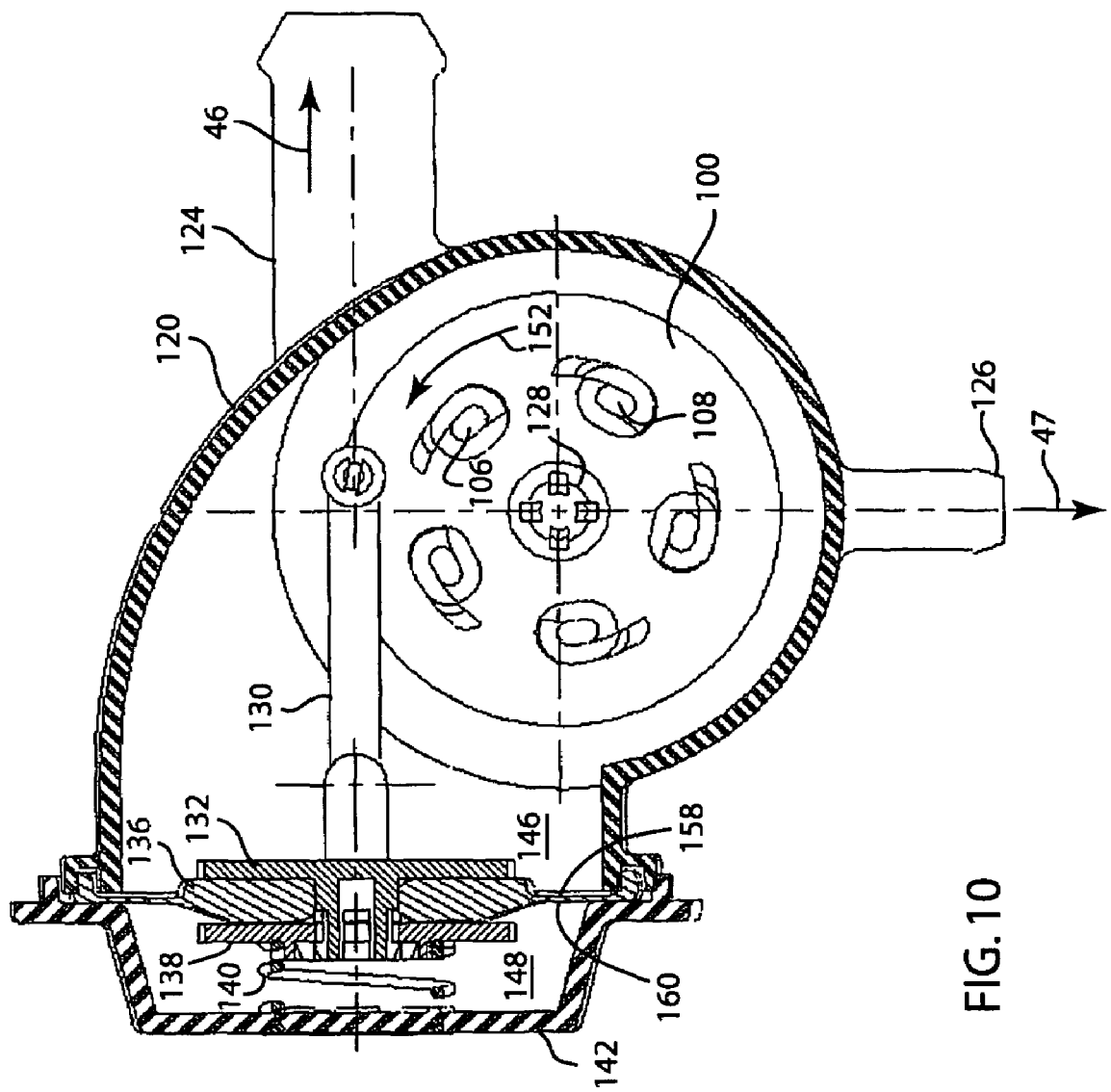
FIG. 10 is like FIG. 9 and shows another position of the actuator.

FIG. 9 shows a low pressure condition of the gas-liquid flow stream 32, with actuator disk 100 rotated clockwise as shown at arrow 150 to a first position minimizing cumulative flow through the plurality of nozzle orifices 106, 108, etc., for example restricting the size of one or more such orifices and/or closing one or more of such orifices. FIG. 10 shows a higher pressure condition of gas-liquid flow stream 32, with actuator disk 100 rotated counterclockwise as shown at arrow 152 to a second position maximizing cumulative flow through the plurality of nozzle orifices 106, 108, etc., e.g. by expanding one or more of such orifices and/or opening one or more of such orifices. The actuator has a plurality of positions between its minimum and maximum cumulative flow positions in response to pressure of the gas-liquid stream to maintain the pressure constant, i.e. maintain a constant ΔP relative to a given reference. The given reference may be atmospheric pressure, for example as provided by one or more vent openings 154, 156 in end cap 142 communicating with chamber 148.

In the embodiment of FIGS. 5-10, the noted pressure sensor is provided by diaphragm 136 having first and second opposite sides 158 and 160, with the first side 158 coupled through plate 132 and link 130 to actuator disk 100, comparably to diaphragm 70, FIG. 1, having first and second opposite sides 69 and 71, with first side 69 coupled through link 72 to actuator disk 62. One of the first and second sides of the diaphragm is exposed to pressure in the gas-liquid stream 32 to control movement of the actuator. In FIGS. 1 and 9, the noted first side 69, 158 of the respective diaphragm 70, 136 is exposed to pressure in the gas-liquid stream to control movement of the actuator. In other embodiments, to be described, the second side of the diaphragm is exposed to pressure in the gas-liquid stream to control movement of the actuator. In FIGS. 1-2 and 5-10, the biasing member 76, 140 is overcome by a given pressure in gas-liquid stream 32 in respective chamber 74, 146 on respective first side 69, 158 of respective diaphragm 70, 136.

Figure 11:
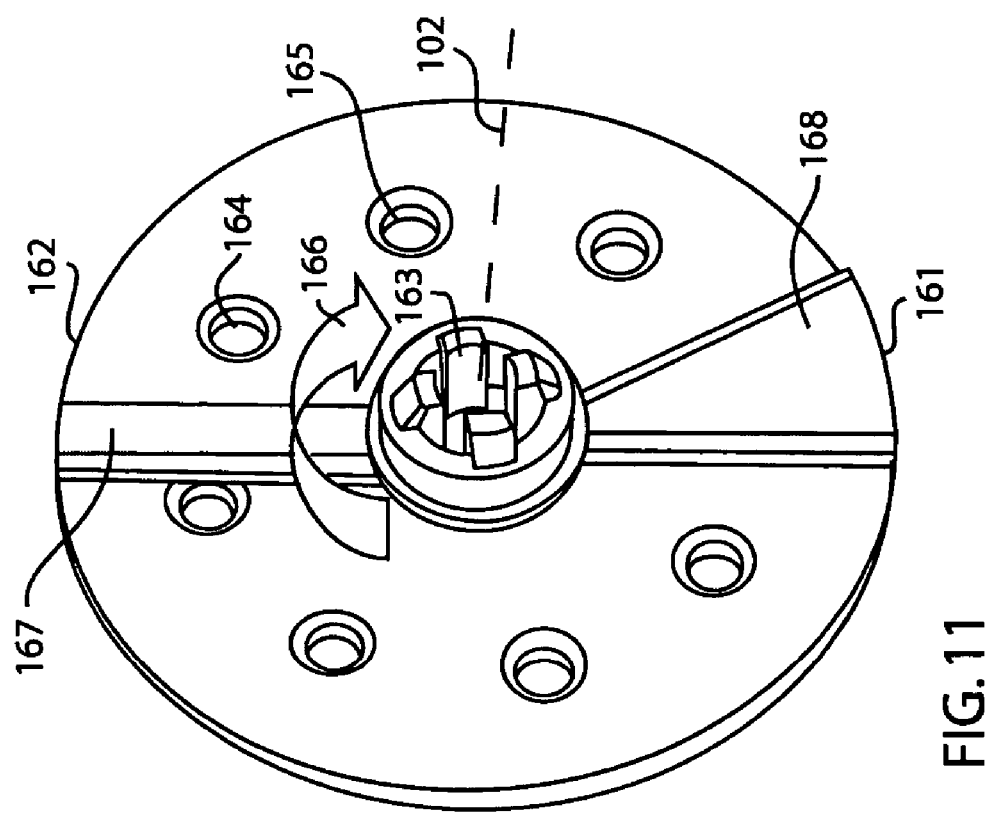
FIG. 11 is a schematic perspective view of a portion of FIG. 1 but showing another embodiment.

FIG. 11 shows another embodiment having an actuator disk 161 rotatable about rotation axis 102 parallel to axial flow direction 58. Actuator disk 161 is rotationally mounted on housing plate 162 at spindle 163 and is rotational to open or close one or more nozzle orifices such as 164, 165, etc. Upon rotation of disk 161 as shown at arrow 166, one or more radial arms 167, 168 of the disk, which may have differing arcuate lengths, open or close respective nozzle orifices, to thus vary the noted cumulative flow through the nozzle structure by varying the number of nozzle orifices available for flow therethrough.

Figure 12:
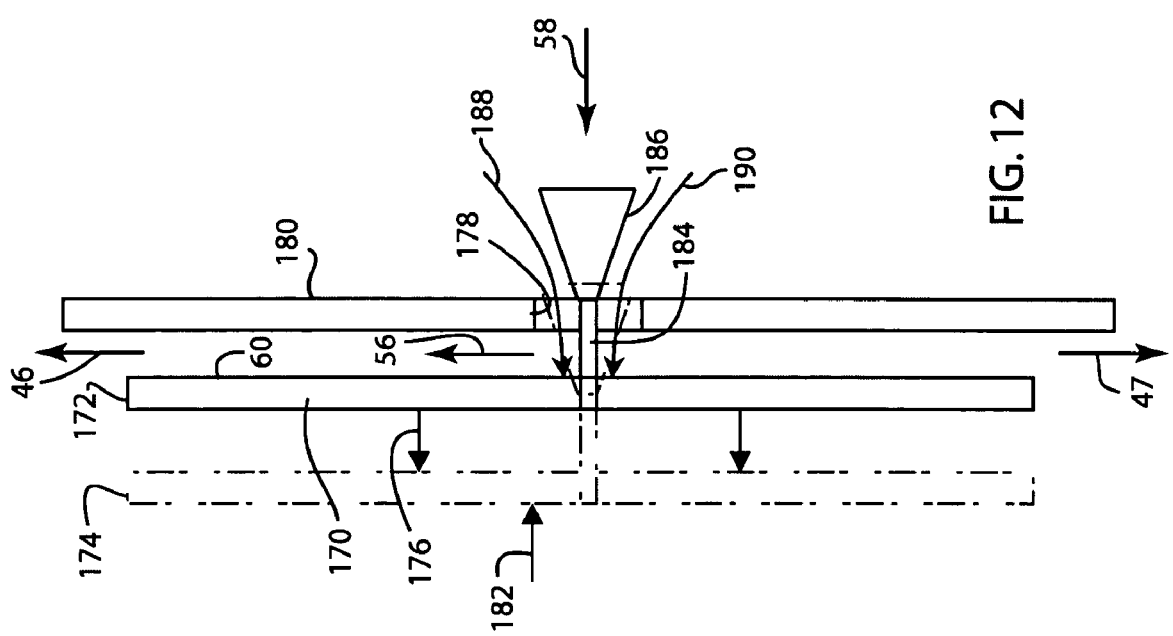
FIG. 12 is a schematic illustration of a portion of another inertial gas-liquid impactor separator in accordance with the parent invention.

FIG. 12 shows another embodiment having an actuator disk 170 translational along a direction parallel to axial flow direction 58. Actuator 170 is movable from solid line position 172 to dashed line position 174 along arrow 176 in the same direction as axial flow direction 58 to decrease the noted cumulative flow of the gas-liquid stream by restricting or closing nozzle orifices such 178 in housing wall 180. Actuator 170 is movable from dashed line position 174 to solid line position 172 as shown at arrow 182 in the opposite direction to axial flow direction 58, to increase the noted cumulative flow. The actuator includes valve stems such as 184 having respective conically shaped valve heads such as 186 engageable with respective valve seats provided by the nozzle orifices such as 178. The valve head 186 is conically shaped along a taper which narrows toward a direction pointing in the same direction as axial flow direction 58. The valve seats may be conically shaped complementally to the valve heads. In an open valve condition as shown in solid line at 172, the gas-liquid stream flows as shown at 188, 190 through nozzle orifice 178 and strikes impaction surface 60, which may be the facing surface of actuator 170 or may be provided by an impactor collector such as 54 mounted thereto, causing liquid-particle separation as above.

FIGS. 13-18 show a preferred implementation of the embodiment of FIG. 12. Housing 200 has an inlet 202, comparable to inlet 42, FIG. 1, for receiving the gas-liquid stream 32, e.g. from crankcase 36. Housing 200 has an outlet 204, comparable to outlet 44, FIG. 1, for discharging gas stream 46, e.g. to air intake manifold 38. Housing 200 has a drain 206, comparable to drain 45, FIG. 1, draining separated fluid 47 from impactor collector 54, e.g. returning collected oil droplets at 47 to crankcase 36. Inner housing wall 180 has a plurality of nozzle orifices 178, 208, etc. Actuator disk 170 has a plurality of valve stems 184, 210, etc. having respective valve heads 186, 212, etc. opening and closing and/or restricting and expanding respective nozzle orifices 178, 208, etc. Actuator disk 170 is mounted on diaphragm 214 which is sealed at its periphery 216 in the housing. The housing includes a chamber 218 receiving the gas-liquid stream from inlet 202, a subchamber 220 between inner housing wall 180 and first side 222 of diaphragm 214, and a chamber 224 on the second side 226 of the diaphragm. The housing is closed by a first closure cap 228 enclosing chamber 218, and a second closure cap 230 enclosing chamber 224.

Figure 13:
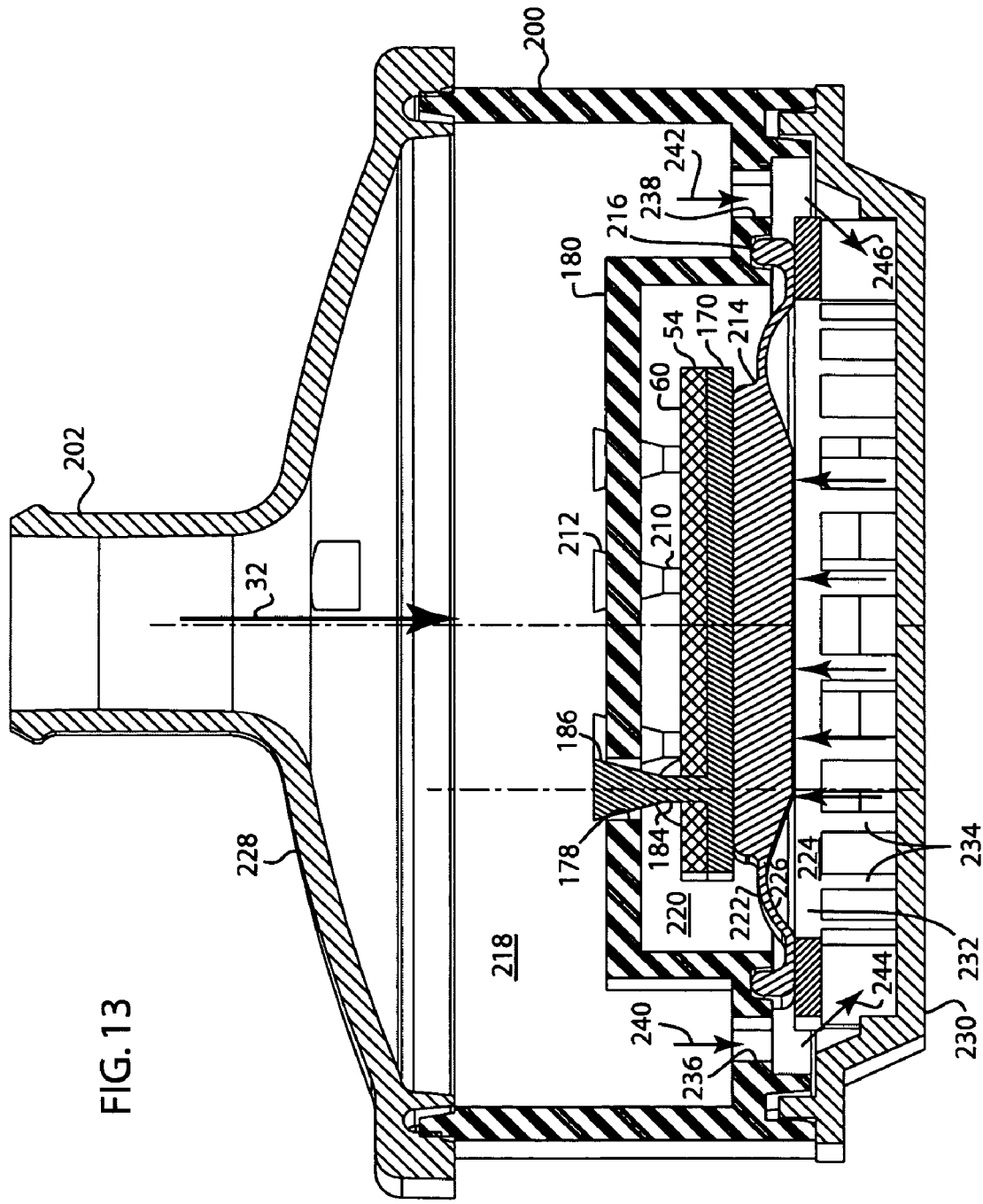
FIG. 13 is a sectional view of an inertial gas-liquid impactor separator incorporating the embodiment of FIG. 12.

The gas-liquid stream 32 flows through housing inlet 202 into chamber 218 between closure cap 228 and inner housing wall 180. Subchamber 220 is between inner housing wall 180 and diaphragm 214 and receives the gas-liquid flow stream communicated through nozzle orifices 178, 208, etc., when open. Chamber 224 is between closure cap 230 and the noted second side 226 of diaphragm 214 and includes a spacer ring 232 having a plurality of spacer legs 234 for providing a plenum in chamber 224. A plurality of communication passages 236, 238, etc. provide communication of gas-liquid flow stream pressure therethrough as shown at arrows 240, 242, etc. from chamber 218 into chamber 224 as shown at arrows 244, 246, etc. The size and number of communication passages 236, 238, etc. are selected such that the ratio of pressure on second side 226 of diaphragm 214 resulting from and relative to the pressure of the gas-liquid stream is greater than the ratio of the pressure on first side 222 of diaphragm 214 relative to and resulting from the pressure of the gas-liquid stream. Diaphragm 214 is inherently biased, or alternatively has a non-stretched position, as shown in FIG. 13, with nozzle orifices 178, 208, etc. closed by valve heads 186, 212, etc., which is the dashed line position 174 shown in FIG. 12. This inherent bias or non-stretched position of the diaphragm has a bias toward such closed position of the nozzle orifices which is greater than the pressure in chamber 224 on second side 226 of the diaphragm, e.g. at low engine speed. As the pressure of the gas-liquid stream increases, the pressure in chamber 224 on second side 226 of the diaphragm increases and overcomes the inherent bias of diaphragm 214 to stretch and move the diaphragm to the position shown in FIG. 14, which is the solid line position 172 in FIG. 12, to begin to open nozzle orifices 178, 208, by moving valve heads 186, 212, etc. away from their respective valve seats along direction 182, FIG. 12. This opening movement of the valves is opposed and counterbalanced by the pressure in subchamber 220 on first side 222 of the diaphragm now available due to the gas-liquid stream flow as shown at arrows 188, 190 through the respective nozzle orifices into subchamber 220. The noted ratio of pressures on the first and second sides of the diaphragm control the opening and closing of the valves, and vary the size of the nozzle orifices, and if desired the number of orifices opened or closed.

The cumulative flow through the nozzles is varied by variable flow actuator 170 wherein movement of such actuator varies at least one of the size and number of orifices 178, 208, etc. The cumulative flow may further be varied by varying: the axial height of valve stems 184, 210, etc. stem-to-stem; the taper, width, etc. of valve heads 186, 212, etc. from head-to-head; the size of the orifices 178, 208, etc.; the pressure ratio on opposite sides 222 and 226 of the diaphragm by varying the size and number of communication passages 236, 238; and various combinations thereof.

Figure 14:
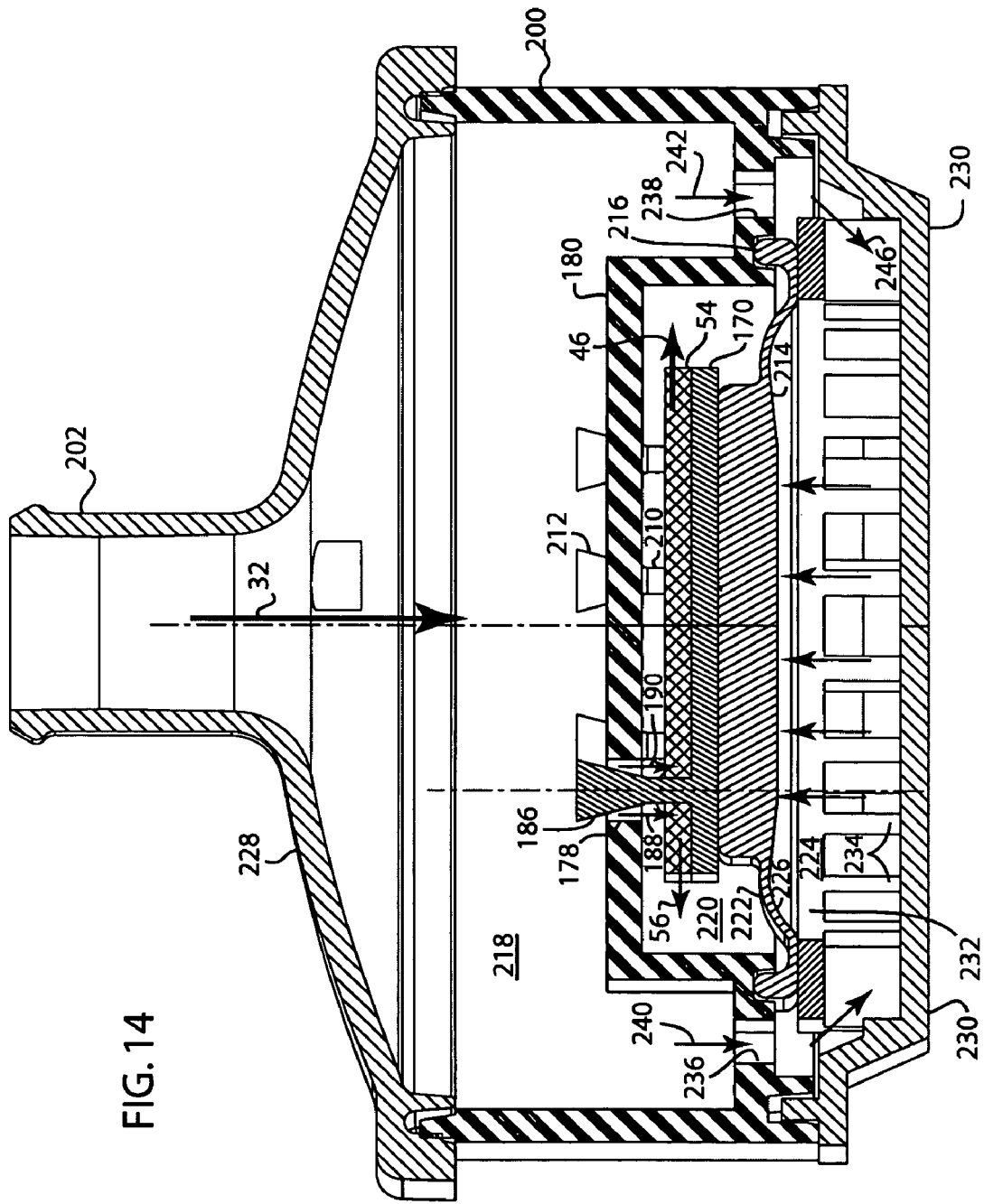
FIG. 14 is like FIG. 13 and shows another position of the actuator.
Figure 15:
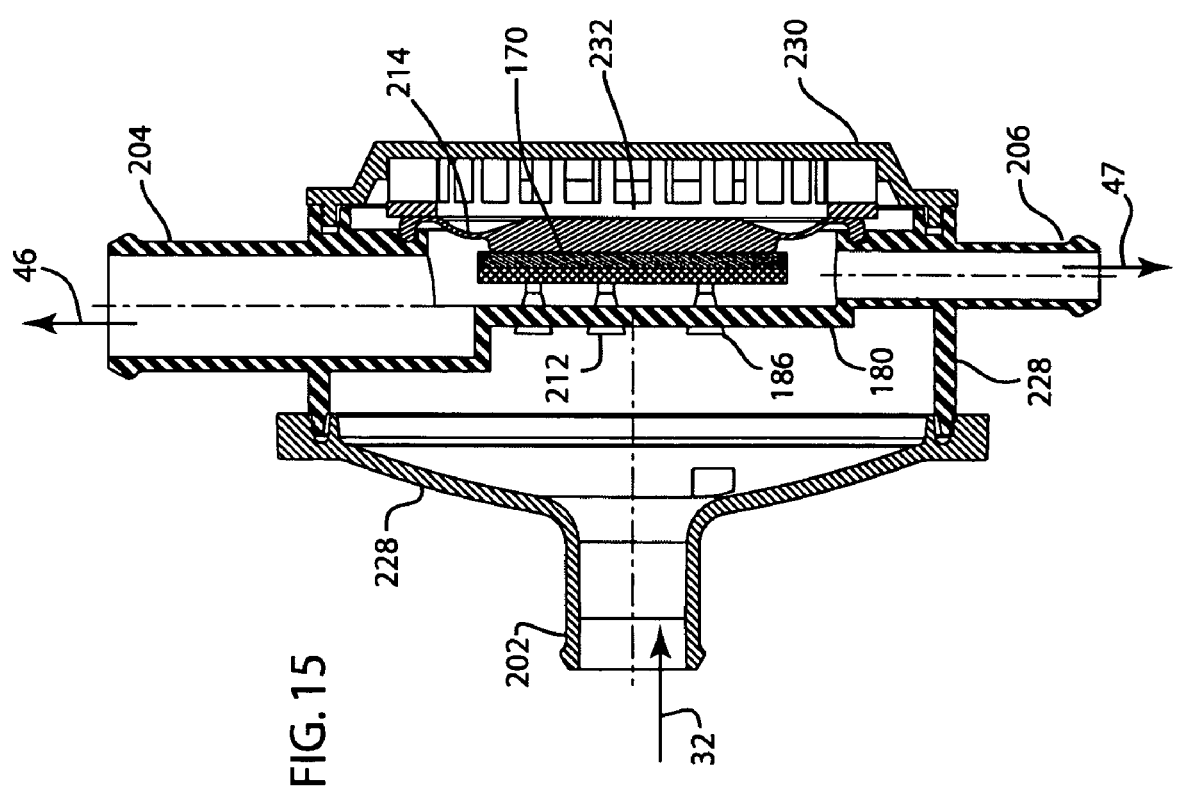
FIG. 15 is a sectional view of the construction of FIG. 13.
Figure 16:
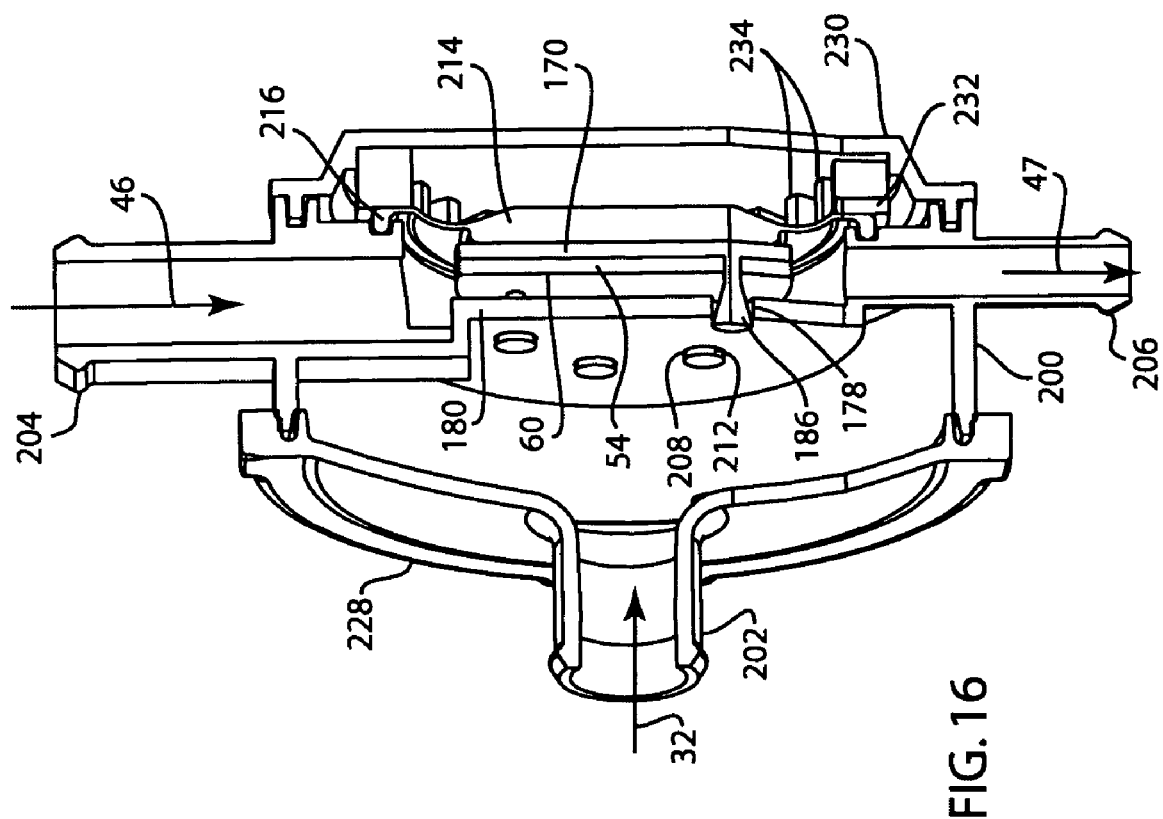
FIG. 16 is a perspective view of the construction of FIG. 13.
Figure 17:
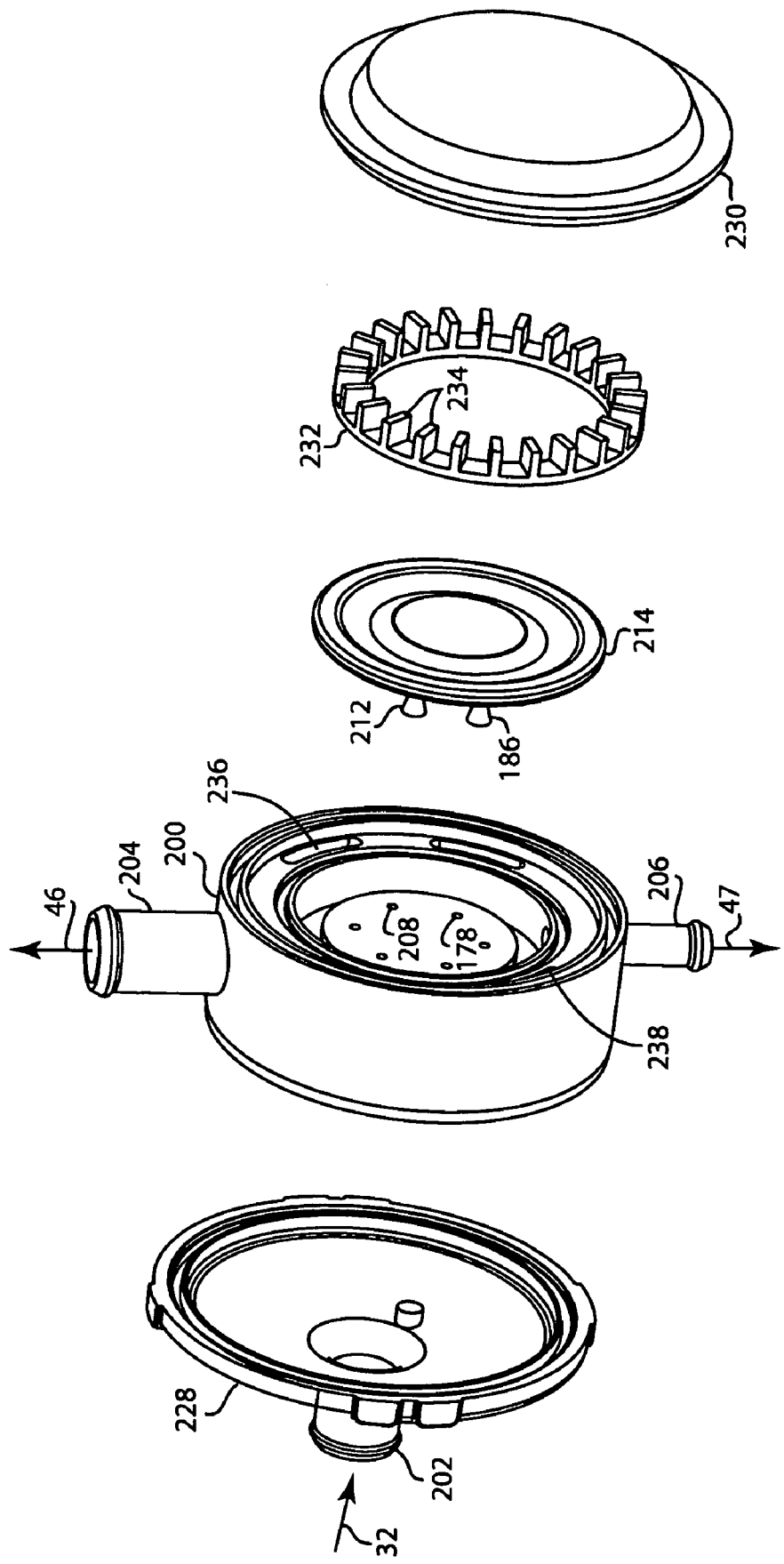
FIG. 17 is an exploded perspective view of the construction of FIG. 16.
Figure 18:
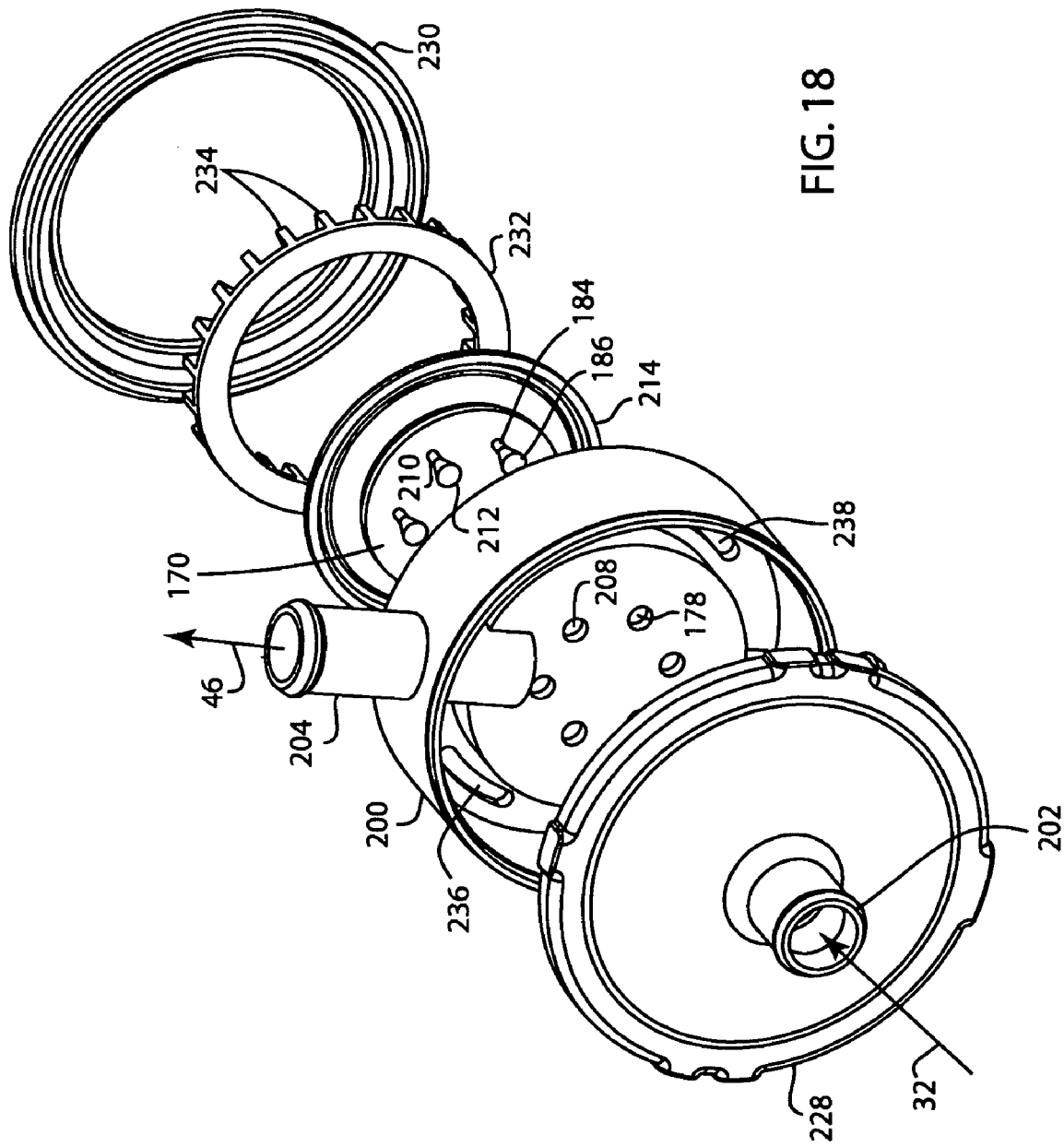
FIG. 18 is another exploded perspective view of the construction of FIG. 16.

Actuator 170 has a first position as shown in FIG. 13 and in dashed line 174 in FIG. 12, minimizing or closingly stopping cumulative flow of the gas-liquid stream through the plurality of nozzle orifices 178, 208. The actuator has a second position as shown in FIG. 14 and in solid line 172 in FIG. 12, maximizing cumulative flow through the plurality of nozzle orifices 178, 208, etc. Actuator 170 is moved by the pressure sensor provided by diaphragm 214 between the noted first and second positions and a plurality of positions therebetween in response to pressure of the gas-liquid stream to maintain such pressure constant, i.e. maintain a constant ΔP if desired. As above, this overcomes prior trade-offs in a fixed separator which is non-adaptive to changing engine or flow conditions nor different engine sizes. Side 226 of the diaphragm is exposed to pressure in the gas-liquid stream in both of the noted first and second positions of the actuator and the intermediate positions therebetween. Side 222 of the diaphragm is exposed to pressure in the gas-liquid stream in the noted second position and intermediate positions of the actuator.

FIG. 19 shows a further embodiment, with an actuator 250 translational along a direction 252 parallel to axial flow direction 58, comparably to actuator 170, FIG. 12, for opening and closing, and/or enlarging and restricting nozzle orifices such as 254, 256, etc. in housing wall 258. Actuator 250 has a plurality of valve stems 260, 262, etc. having conically shaped valve heads 264, 266, etc., engageable with respective valve seats such as 268, 270, etc. which valve seats may be conically shaped complementally to the valve heads. Unlike FIG. 12, valve heads 264, 266 in FIG. 19 are conically shaped along a taper which narrows toward a direction pointing opposite to axial flow direction 58. Variable flow actuator 250 varies the cumulative flow of the gas-liquid flow stream through nozzle orifices 254, 256, etc. in response to a given parameter, by moving back and forth as shown at arrow 252. If pressure in the gas-liquid flow stream is the designated parameter, the pressure against valve heads 264, 266 may be used to open the valves, and the pressure against such valve heads and surface 272 of the actuator disk may be used to vary and expand the cumulative flow area by increasing the cross-sectional area of the nozzle orifices. A biasing spring such as 76, 140 may bear against surface 274 of the actuator disk to bias the actuator to a closed or restricted position. Actuator 250 moves in the same direction as axial flow direction 58 to increase the noted cumulative flow, and moves in the opposite direction to axial flow direction 58 to decrease the noted cumulative flow.

FIGS. 20-22 show a further embodiment having a plurality of actuator assemblies 280, 282, 284, 286 in housing 290. In actuator assembly 280, housing sub-wall 292 has a plurality of nozzle orifices such as 294, 296, 298, etc. through which the gas-liquid flow stream at 58 is accelerated and strikes inertial impactor collector 54 at impaction surface 60, as above, causing liquid particle separation from the gas-liquid stream. Impactor collector 54 is mounted on variable flow actuator 300, or alternatively face surface 302 of the actuator may provide the impaction surface 60. Actuator 300 is translational back and forth as shown at arrow 304 along a direction parallel to axial flow direction 58, and is biased to a closed position (upwardly in FIG. 22), by a spring 306 bearing between underside 308 of actuator disk 300 and a spring seat 310 of the housing. In the upwardly biased closed position shown in FIG. 22, an annular gasket 312 on the outer circumference of actuator disk 300 engages the lower apex of V-shaped valve seat 314 of the housing in sealing relation to block gas stream and liquid stream flow therepast. Actuator 300 is movable in a second direction (downwardly in FIG. 22) to a second open position wherein gasket 312 is moved downwardly away from and disengaged from valve seat 314 by a gap therebetween to permit gas stream flow therepast to the housing outlet, shown schematically at 44 in FIG. 22, and to permit liquid stream flow therepast to the housing drain, shown schematically at 45 in FIG. 22. The remaining actuator assemblies 282, 284, 286 are the same.

The inertial impactor collector of the above embodiments of FIGS. 1-19 is provided in FIGS. 20-22 as a plurality of impaction surfaces 60, 60a, 60b, 60c each receiving the gas-liquid stream through a respective set of one or more orifices 294, 296, 298, etc. The variable flow actuator is provided by a plurality of impaction buttons 300, 300a, 300b, 300c each carrying a respective impaction surface 60, 60a, 60b, 60c. Each impaction button is movable between the noted closed and open positions independently of the other impaction buttons. The noted cumulative flow of the gas-liquid stream at 58 is varied by varying the number of impaction buttons in at least one of the closed and open positions. For example, cumulative flow may be increased by opening one or more of the impaction buttons, and decreased by closing one or more impaction buttons. The impaction buttons are spring biased at different spring rates, to provide differential sequential opening and closing thereof. For example, each of springs 306, 306a, 306b, 306c has a different spring rate, such that, for example, impaction button 300 opens first in response to increasing pressure, and then impaction button 300a opens in response to further increasing pressure, and then impaction button 300b opens in response to yet further increasing pressure, and so on. Impaction buttons 300, 300a, 300b, 300c are translational along a direction parallel to axial flow direction 58, and are biased to the noted closed position (upwardly in FIG. 20) along the noted direction parallel to axial flow direction 58.

Referring to FIG. 1, gas-liquid stream 32 becomes gas stream 46 and flows from upstream to downstream through the housing from inlet 42 then through nozzle orifices 50, 52, etc. then to inertial impactor collector 54 at impaction surface 60 then to outlet 44. In the embodiments of FIGS. 1-19, the noted actuator is upstream of the inertial impactor collector. In the embodiment of FIGS. 20-22, the actuator is downstream of the inertial impactor collector.

Present Application

FIG. 23 shows an inertial gas-liquid separator 320 for removing liquid particles from a gas-liquid stream. A housing 322 has an inlet 324 for receiving a gas-liquid stream 326, and an outlet 328 for discharging a gas stream 330. Nozzle structure 332 in the housing includes a plurality of nozzles such as 334 receiving the gas-liquid stream from inlet 324 and accelerating the gas-liquid stream through the nozzles. An inertial impactor collector 336 is provided in the housing in the path of the accelerated gas-liquid stream and causes liquid particle separation from the gas-liquid stream, followed by flow of the gas stream as shown at 338, and drainage of liquid 340 at drain 342. A variable flow actuator 344 is movable, e.g. up and down in FIG. 23, to open and close a variable number of nozzles 334.

Variable flow actuator 344 is responsive to pressure of gas-liquid stream 326. The variable flow actuator responds to increasing pressure by moving, e.g. upwardly in FIG. 23, to open more of nozzles 334. The variable flow actuator responds to decreasing pressure to close more of nozzles 334,. e.g. by moving downwardly in FIG. 23. In this manner, a substantially constant pressure drop is maintained across inertial gas-liquid separator 320 between inlet 324 and outlet 328 notwithstanding changing flow conditions of the gas-liquid stream therethrough. It is preferred that the distance between nozzles 334 and inertial compactor collector 336 be constant and unchanged by movement of variable flow actuator 344.

In FIG. 23, variable flow actuator 344 is provided by a piston 346 axially slidable along a cylinder 348 extending along an axis 350. The cylinder has cylinder wall 352 with a plurality of apertures 354 therethrough providing the noted plurality of nozzles. The apertures are covered and uncovered by piston 346 during sliding of the piston along the cylinder to respectively close and open the nozzles. Inertial impactor 336 is an annular member spaced radially outwardly of cylinder 348 by an annular acceleration gap 356 therebetween. Apertures 354 extend radially through cylinder wall 352. Gas-liquid stream 326 flows axially within cylinder 348 and then radially outwardly through apertures 354 uncovered by piston 346 and is accelerated into annular acceleration gap 356 and impact inertial impactor collector 336 causing liquid particle separation from the gas-liquid stream. Gas-liquid stream 326 flows in a given axial direction within cylinder 348, e.g. upwardly in FIG. 23. After the noted separation, the gas stream at 338 flows in the same given axial direction along the exterior of cylinder 348. The gas-liquid stream flows through inlet 324 in the noted given axial direction. The gas stream at 330 flows through outlet 328 in the same noted given axial direction.

Piston 346 has a leading surface 358 facing the incoming flow of the gas-liquid stream 326 thereagainst. Leading surface 358 is configured to directionally guide and direct flow to apertures 354 in cylinder wall 352. In one embodiment, such directional configuration is a cone shape or a convex shape or a channeled guide surface, etc.

In the embodiment of FIG. 23, piston 346 is a gravimetric piston relying on the weight of the piston to regulate flow. The noted axis of movement is vertical. Piston 346 has the bottom face of leading surface 358 facing downwardly and receiving the incoming flow of the gas-liquid stream 326 thereagainst. Piston 346 slides upwardly in cylinder 348 in response to increasing pressure of the gas-liquid stream 326 to open up more of apertures 354. The piston slides downwardly in the cylinder in response to decreasing pressure of the gas-liquid stream 326 to close off more of apertures 354. The top of the cylinder includes a vent hole 360 to avoid creation of a vacuum within the cylinder during piston movement, so as not to impede movement of the piston.

FIG. 24 shows another embodiment and uses like reference numerals from above where appropriate to facilitate understanding. A biasing member, such as spring 362, biases piston 346*a* against the incoming flow of gas-liquid stream 326 thereagainst. Piston 346*a* slides in a first axial direction, e.g. upwardly in FIG. 24, against the bias of biasing spring 362 in response to increasing pressure of gas-liquid stream 326 to open more of apertures 354. Piston 346*a* slides in a second opposite direction, e.g. downwardly in FIG. 24, as biased by biasing spring 362 in response to decreasing pressure of gas-liquid stream 326 to close off more of apertures 354.

FIG. 25 shows another embodiment of an inertial gas-liquid separator 370 for removing liquid particles from a gas-liquid stream. A housing 372 has an inlet 374 for receiving a gas-liquid stream 376, and has an outlet 378 for discharging a gas stream 380. Nozzle structure 382 in the housing has a plurality of nozzles 384 receiving the gas-liquid stream from inlet 374 and accelerating the gas-liquid stream through the nozzles. An inertial impactor collector 386 is provided in the housing, which may be an interior wall of the housing, in the path of the accelerated gas-liquid stream. A variable flow actuator 388 in the housing is movable to open and close a variable number of nozzles 384.

Housing 372 has a wall 390 facing inertial impactor collector 386 and separated therefrom by an annular acceleration gap 392 therebetween. Wall 390 has a plurality of apertures 394 therethrough providing the noted nozzles 384. Variable flow actuator 388 is provided by a rolling diaphragm 396 having a resilient flexible region 398 covering and uncovering apertures 394 in a flexing motion to respectively close and open nozzles 384. Diaphragm 396 has a first side 400 communicating with inlet 374 and exposed to the incoming flow of the gas-liquid stream 376. The diaphragm has a second opposite side 402 communicating with outlet 378. First side 400 of the diaphragm has a changing effective area, which effective area is defined as the area exposed to incoming flow. The effective area of the diaphragm increases in response to increasing pressure of gas-liquid stream 376, and the diaphragm uncovers and opens up more of apertures 394. The effective area of the diaphragm decreases in response to decreasing pressure of gas-liquid stream 376, and the diaphragm covers and closes off more of apertures 394. Wall 390 is a cylindrical wall of a cylinder 404 in the housing and extending axially along axis 406. Apertures 394 extend radially through cylinder wall 390. Diaphragm 396 has an outer portion 408 extending axially along the interior of cylinder wall 390 and is flexible radially away therefrom to uncover and open more of the apertures 394. Diaphragm 400 has a central portion 410 spanning radially inwardly from the outer portion and movable in a first axial direction, e.g. downwardly in FIG. 25, to flex outer portion 408 of the diaphragm radially inwardly away from apertures 394 and out of engagement of cylinder wall 390 to uncover and open more of the apertures. Central portion 410 is movable in a second opposite axial direction, e.g. upwardly in FIG. 25, to flex outer portion 408 of the diaphragm radially outwardly toward apertures 394 and into engagement with cylinder wall 390 to cover and close off more of the apertures 394. Biasing spring 412 biases central portion 410 of the diaphragm in the noted second axial direction, e.g. upwardly in FIG. 25, and against the incoming flow of gas-liquid stream 376. The separated liquid drains as shown at arrow 414 at drain 416. The gas stream flows as shown at arrows 418 to outlet 378. A central column 420 supports an upper sleeve 422 in telescopic axial sliding relation which in turn supports upper central portion 410 of the diaphragm. The. base of support column 420 has a plurality of slots or apertures 424 passing the gas flow therethrough to outlet 378.

FIG. 26 shows another embodiment of an inertial gas-liquid separator 430 for removing liquid particles from a gas-liquid stream. Housing 432 has an inlet 434 for receiving a gas-liquid stream 436, and has an outlet 438 for discharging a gas stream 440. Nozzle structure 442 in the housing has a plurality of nozzles 444 receiving the gas-liquid stream from inlet 434 and accelerating the gas-liquid stream through nozzles 444. An inertial impactor collector 446 is provided in the housing in the path of the accelerated gas-liquid stream and causes liquid particle separation from the gas-liquid stream. The liquid drains as shown at arrow 448 at drain 450. The gas stream continues as shown at arrows 452, 454 to outlet 438. A variable flow actuator 456 is movable to open and close a variable number of nozzles 444. The housing has a wall or plate 458 facing inertial impactor collector 446 and separated therefrom by an acceleration gap 460 therebetween. Wall 458 has a plurality of apertures 462 therethrough providing the noted nozzles. Variable flow actuator 456 is provided by a rolling diaphragm 464 having a resilient flexible region 466 covering and uncovering apertures 462 in a flexing motion to respectively close and open the nozzles. Diaphragm 464 has a first side 468 communicating with inlet 434 and exposed to the incoming flow of gas-liquid stream 436. The diaphragm has a second opposite side 470 communicating with outlet 438. First side 468 of the diaphragm has a changing effective area, such effective area being defined as the area exposed to incoming flow. The effective area of the diaphragm increases in response to increasing pressure of gas-liquid stream 436, and the diaphragm uncovers and opens more of apertures 462. The effective area of the diaphragm decreases in response to decreasing pressure of gas-liquid stream 436, and the diaphragm covers and closes off more of apertures 462.

Wall or plate 458 has an incoming flow opening 472 therethrough communicating with inlet 434 and receiving the incoming flow of gas-liquid stream 436. The incoming flow flows axially along axis 474 through opening 472. Plate 458 extends laterally outwardly from opening 472. The plurality of apertures 462 extend axially through plate 458 and are laterally outward of opening 472. Diaphragm 464 has an outer portion 476 extending laterally along plate 458 and flexible axially, e.g. upwardly in FIG. 26, away therefrom to uncover and open up more of apertures 462. Diaphragm 464 has a central portion 478 spanning laterally inwardly from the outer portion and movable in a first axial direction, e.g. upwardly in FIG. 26, to flex outer portion 476 of the diaphragm axially away from apertures 462 and out of engagement of plate 458 to uncover and open up more of apertures 462. Central portion 478 of the diaphragm is movable in a second opposite axial direction, e.g. downwardly in FIG. 26, to flex outer portion 476 of the diaphragm axially toward apertures 462 and into engagement with plate 458 to cover and close off more of apertures 462. A biasing spring 480 biases central portion 478 of the diaphragm in the noted second axial direction, e.g. downwardly in FIG. 26, and against the incoming flow of gas-liquid stream 436. The gas-liquid stream 436 flows through opening 472 in the noted first axial direction, e.g. upwardly in FIG. 26, and then flows as shown at arrows 482 in the noted second axial direction, e.g. downwardly in FIG. 26. The gas stream flows from acceleration gap 460 as shown at arrows 452, 454 to outlet 440 in the noted first axial direction.

In the above noted embodiments, the system automatically adapts the number or size of apertures to the flow, to keep restriction as constant as possible. This is desirable, particularly in internal combustion engine applications in a truck in a braking mode. In other applications, a change in hole or aperture area is done step by step at extended intervals, for example manually at service intervals for the vehicle, particularly when crankcase pressure reaches a predetermined level. In one example, piston 346, FIG. 23, can be manually changed between different positions at service intervals and retained by a retainer such as a detent, latch, finger in slot, or the like, in a fixed axial position until the next further service interval, at which the service technician will determine if the piston should be moved to a different axial position to cover or uncover more or less apertures 354 until the next service interval, and so on. In another example, the disks such as 84 of FIG. 3 or 100 of FIG. 4 may be fixed in place at a service interval and remain so fixed until the next service interval, at which time they may be adjusted and moved by the service technician, and remain so adjusted until a subsequent service interval, and so on. In another example, a pair of disks may be provided which can be angularly rotated or slid relative to each other and locked in position, with a series of detents or clicks, with gradations indicating to the service technician a given setting corresponding to a given crankcase pressure reading. The mechanic will then manually slide or rotate a disk or other variable actuator to a given set position, to accommodate wear since the last service interval and to correspond to a current crankcase pressure reading as the engine ages.

It is recognized that various equivalents, alternatives and modifications are possible within the scope of the appended claims. The invention is particularly useful in closed crankcase ventilation (CCV) and open crankcase ventilation (OCV) applications, though it may be used in various other inertial gas-liquid impactor separator applications for removing liquid particles from a gas-liquid stream.

What is claimed is:

1. An inertial gas-liquid separator for removing liquid particles from a gas-liquid stream, comprising a housing having an inlet for receiving a gas-liquid stream, and an outlet for discharging a gas stream, nozzle structure in said housing having a plurality of nozzles receiving said gas-liquid stream from said inlet and accelerating said gas-liquid stream through said nozzles, an inertial impactor collector in said housing in the path of said accelerated gas-liquid stream and causing liquid particle separation from said gas-liquid stream, a variable flow actuator movable to vary flow through at least one of said nozzles, wherein said inertial impactor collector is downstream of and spaced from said variable flow actuator.

2. The inertial gas-liquid separator according to claim 1 wherein said variable flow actuator is responsive to pressure of said gas-liquid stream.

3. The inertial gas-liquid separator according to claim 2 wherein said variable flow actuator responds to increasing said pressure by moving to increase flow, and responds to decreasing said pressure to decrease flow, such that a substantially constant pressure drop is maintained across said inertial gas-liquid separator between said inlet and said outlet notwithstanding changing flow conditions of said gas-liquid stream therethrough.

4. The inertial gas-liquid separator according to claim 1 wherein the distance between said nozzles and said inertial impactor collector is constant and unchanged by movement of said variable flow actuator.

5. The inertial gas-liquid separator according to claim 1, wherein said variable flow actuator comprises a piston axially slidable along a cylinder extending along an axis, said cylinder having a cylinder wall with a plurality of apertures therethrough providing said plurality of nozzles, said apertures being covered and uncovered by said piston during sliding of said piston along said cylinder to respectively close and open said nozzles.

6. The inertial gas-liquid separator according to claim 5 wherein:
   said inertial impactor collector is spaced radially outward of said cylinder by an annular acceleration gap therebetween;
   said apertures extend radially through said cylinder wall;
   said gas-liquid stream flows axially within said cylinder and then radially outwardly through said apertures uncovered by said piston and is accelerated into said annular acceleration gap and impacts said inertial impactor collector causing liquid particle separation from said gas-liquid stream.

7. The inertial gas-liquid separator according to claim 6 wherein:
   said gas-liquid stream flows in a given axial direction within said cylinder; and
   after said separation said gas stream flows in the same said given axial direction along the exterior of said cylinder.

8. The inertial gas-liquid separator according to claim 7 wherein:
   said gas-liquid stream flows through said inlet in said given axial direction; and
   said gas stream flows through said outlet in said given axial direction.

9. The inertial gas-liquid separator according to claim 5 wherein said piston has a leading surface facing the incoming flow of said gas-liquid stream thereagainst, said leading surface being configured to directionally guide and direct flow to said apertures in said cylinder wall.

10. The inertial gas-liquid separator according to claim 5 wherein said piston is a gravimetric piston relying on the weight of said piston to regulate flow, said axis being vertical, said piston having a bottom face facing downwardly and receiving the incoming flow of said gas-liquid stream thereagainst, said piston sliding upwardly in said cylinder in response to increasing pressure of said gas-liquid stream to open up more of said apertures, said piston sliding downwardly in said cylinder in response to decreasing pressure of said gas-liquid stream to close off more of said apertures.

11. The inertial gas-liquid separator according to claim 5 comprising a biasing member biasing said piston against the incoming flow of said gas-liquid stream thereagainst, said piston sliding in a first axial direction against the bias of said biasing member in response to increasing pressure of said gas-liquid stream to open up more of said apertures, said piston sliding in a second opposite axial direction as biased by said biasing member in response to decreasing pressure of said gas-liquid stream to close off more of said apertures.

12. The inertial gas-liquid separator according to claim 1 wherein said housing has a wall facing said inertial impactor collector and separated therefrom by an acceleration gap therebetween, said wall having a plurality of apertures therethrough providing said nozzles, and said variable flow actuator comprises a rolling diaphragm having a resilient flexible region covering and uncovering said apertures in a flexing motion to respectively close and open said nozzles.

13. The inertial gas-liquid separator according to claim 12 wherein said diaphragm has a first side communicating with said inlet and exposed to the incoming flow of said gas-liquid stream, and said diaphragm has a second opposite side communicating with said outlet, said first side of said diaphragm having a changing effective area, said effective area being defined as the area exposed to said incoming flow.

14. The inertial gas-liquid separator according to claim 13 wherein:
said effective area of said diaphragm increases in response to increasing pressure of said gas-liquid stream, and said diaphragm uncovers and opens up more of said apertures;
said effective area of said diaphragm decreases in response to decreasing pressure of said gas-liquid stream, and said diaphragm covers and closes off more of said apertures.

15. The inertial gas-liquid separator according to claim 14 wherein said wall is a cylinder wall of a cylinder in said housing and extending axially along an axis, said apertures extend radially through said cylinder wall, said diaphragm has an outer portion extending axially along the interior of said cylinder wall and flexible radially away therefrom to uncover and open up more of said apertures.

16. The inertial gas-liquid separator according to claim 15 wherein said diaphragm has a central portion spanning radially inwardly from said outer portion and movable in a first axial direction to flex said outer portion of said diaphragm radially inwardly away from said apertures and out of engagement with said cylinder wall to uncover and open up more of said apertures, said central portion being movable in a second opposite axial direction to flex said outer portion of said diaphragm radially outwardly toward said apertures and into engagement with said cylinder wall to cover and close off more of said apertures.

17. The inertial gas-liquid separator according to claim 16 comprising a biasing member biasing said central portion of said diaphragm in said second axial direction and against the incoming flow of said gas-liquid stream.

18. The inertial gas-liquid separator according to claim 14 wherein said wall comprises a plate having an incoming flow opening therethrough communicating with said inlet and receiving the incoming flow of said gas-liquid stream, said incoming flow flowing axially through said opening, said plate extending laterally outwardly from said opening, said plurality of apertures extending axially through said plate and being laterally outward of said opening, said diaphragm having an outer portion extending laterally along said plate and flexible axially away therefrom to uncover and open up more of said apertures.

19. The inertial gas-liquid separator according to claim 18 wherein said diaphragm has a central portion spanning laterally inwardly from said outer portion and movable in a first axial direction to flex said outer portion of said diaphragm axially away from said apertures and out of engagement with said plate to uncover and open up more of said apertures, said central portion being movable in a second opposite axial direction to flex said outer portion of said diaphragm axially toward said apertures and into engagement with said plate to cover and close off more of said apertures.

20. The inertial gas-liquid separator according to claim 19 comprising a biasing member biasing said central portion of said diaphragm in said second opposite axial direction and against the incoming flow of said gas-liquid stream.

21. The inertial gas-liquid separator according to claim 19 wherein said gas-liquid stream flows through said opening in said first axial direction and flows through said apertures in said second opposite axial direction, and wherein said gas stream flows from said acceleration gap to said outlet in said first axial direction.

22. An inertial gas-liquid impactor separator for removing liquid particles from a gas-liquid stream, comprising a housing having an inlet for receiving a gas-liquid stream, and an outlet for discharging a gas stream, nozzle structure in said housing having one or more nozzles receiving said gas-liquid stream from said inlet and accelerating said gas-liquid stream therethrough, said one or more nozzles providing a cumulative flow therethrough, an inertial impactor collector in said housing in the path of said accelerated gas-liquid stream and causing liquid particle separation from said gas-liquid stream, said path of said accelerated gas-liquid stream extending along a given acceleration direction, a variable flow actuator varying said cumulative flow through said one or more nozzles, said actuator being movable along a given actuation direction transverse to said given acceleration direction,
wherein:
said gas-liquid stream has an incoming flow direction directed against and striking said actuator;
said incoming flow direction is parallel to said given actuation direction; and
said actuator is upstream of and spaced from said inertial impactor collector.

23. The inertial gas-liquid impactor separator according to claim 22 wherein said gas-liquid stream flows along said given acceleration direction in said housing through said one or more nozzles and then is separated at an impaction turn at said inertial impactor collector, at least one of said gas and said liquid particles flowing along a post-impaction direction which is the same as said actuation direction.

24. The inertial gas-liquid impactor separator according to claim 23 wherein said actuator is movable along first and second opposite actuation directions, said first actuation direction of said actuator increasing said cumulative flow through said one or more nozzles, said second actuation direction of said actuator decreasing said cumulative flow through said one or more nozzles, said post-impaction direction being said second actuation direction.

25. The inertial gas-liquid impactor separator according to claim 24 wherein said housing has a drain port draining said liquid particles, and a post-impaction downstream turn between said inertial impactor collector and said drain port, at least one of said gas and said liquid particles turning at said downstream turn, said drain port being gravitationally below said downstream turn and said actuator, said outlet being gravitationally above said downstream turn.

26. The inertial gas-liquid impactor separator according to claim 25 wherein said outlet is gravitationally above said actuator.

27. The inertial gas-liquid impactor separator according to claim 25 wherein each of said gas and said liquid particles turns at said downstream turn.

28. The inertial gas-liquid impactor separator according to claim 22 wherein said gas-liquid stream flows along a first direction in said housing and then turns and flows along a second direction in said housing through said one or more nozzles, said second direction being said acceleration direction, said first direction being said actuation direction.

29. The inertial gas-liquid impactor separator according to claim 22 wherein said housing defines first, second, and third flow path segments serially coupled through first and second turns, one of said segments being an acceleration segment through said one or more nozzles, one of said turns being at said inertial impactor collector.

30. The inertial gas-liquid impactor separator according to claim 29 wherein said first, second, and third flow path segments are serially coupled upstream to downstream in said housing such that flow traverses said first flow path segment and then turns at said first turn and traverses said second flow path segment and then turns at said second turn and traverses said third flow path segment, said actuator being upstream of said third flow path segment and upstream of said second turn.

31. The inertial gas-liquid impactor separator according to claim 30 wherein said actuator is located along said first flow path segment.

32. The inertial gas-liquid impactor separator according to claim 31 wherein said variable actuator is upstream of said first turn.

33. The inertial gas-liquid impactor separator according to claim 32 wherein said first turn is at said inertial impactor collector.

34. The inertial gas-liquid impactor separator according to claim 30 wherein said first turn is at said actuator.

35. The inertial gas-liquid impactor separator according to claim 34 wherein said second turn is at said inertial impactor collector, and said actuator is upstream of said second turn.

36. The inertial gas-liquid impactor separator according to claim 31 wherein said actuator is located along said first and second flow path segments at the junction thereof at said first turn.

37. The inertial gas-liquid impactor separator according to claim 30 wherein said actuator varies said cumulative flow by varying the cross-sectional area of one of said flow paths.

38. The inertial gas-liquid impactor separator according to claim 37 wherein said first flow path segment is said acceleration segment, and said actuator varies said cumulative flow by varying the cross-sectional area of said first flow path segment.

39. The inertial gas-liquid impactor separator according to claim 37 wherein said second flow path segment is said acceleration segment, and said actuator varies said cumulative flow by varying the cross-sectional area of said second flow path segment.

40. An inertial gas-liquid impactor separator for removing liquid particles from a gas-liquid stream, comprising a housing having an inlet for receiving a gas-liquid stream, and an outlet for discharging a gas stream, nozzle structure in said housing having one or more nozzles receiving said gas-liquid stream from said inlet and accelerating said gas-liquid stream therethrough, said one or more nozzles providing a cumulative flow therethrough, an inertial impactor collector in said housing in the path of said accelerated gas-liquid stream and causing liquid particle separation from said gas-liquid stream, said path of said accelerated gas-liquid stream extending along a given acceleration direction, a variable flow actuator varying said cumulative flow through said one or more nozzles, said actuator being movable along a given actuation direction, said housing defining first, second and third flow path segments serially coupled though first and second turns, one of said segments being an acceleration segment through said one or more nozzles, one of said turns being at said inertial impactor collector, said housing comprising a first annular wall surrounded by a second annular wall, said second annular wall being spaced from said first annular wall by an annular gap, said first annular wall having a hollow interior defining a first plenum, said annular gap defining a second plenum, said first flow path segment traversing along said first plenum, said second flow path segment traversing across said first annular wall between said first and second plenums, said third flow path segment traversing along said second plenum, said actuator variably constricting and expanding said second flow path segment during traversal of said second flow path segment from said first plenum to said second plenum, wherein:
said inertial impactor collector is downstream of and spaced from said actuator by an annular acceleration gap therebetween;
said inertial impactor collector concentrically surrounds said acceleration gap; and
said acceleration gap concentrically surrounds said actuator.

41. The inertial gas-liquid impactor separator according to claim 40 wherein said second flow path segment is said acceleration segment, and said first annular wall comprises an acceleration portion spaced from said actuator by an acceleration gap which varies during movement of said variable actuator, said one or more nozzles comprising said acceleration portion providing said acceleration gap.

42. The inertial gas-liquid impactor separator according to claim 41 wherein said acceleration portion comprises one or more orifices through said first annular wall.

43. The inertial gas-liquid impactor separator according to claim 41 wherein said actuation direction is transverse to said acceleration direction.

44. An inertial gas-liquid impactor separator for removing liquid particles from a gas-liquid stream, comprising a housing having an inlet for receiving a gas-liquid stream, and an outlet for discharging a gas stream, nozzle structure in said housing comprising a first set of one or more nozzles receiving said gas-liquid stream from said inlet and accelerating said gas-liquid stream therethrough, and a second set of one or more nozzles receiving said gas-liquid stream from said inlet and accelerating said gas-liquid stream therethrough, said first set of one or more nozzles providing a first cumulative flow therethrough, said second set of one or more nozzles providing a second cumulative flow therethrough, one or more inertial impactor collectors in said housing in the respective paths of said accelerated gas-liquid streams and causing liquid particle separation from said gas-liquid streams, said paths of said accelerated gas-liquid streams extending along given respective acceleration directions, a variable flow actuator movable along a given actuation direction and varying at least one of said first and second cumulative flows through the respective set of one or more nozzles, wherein:
said gas-liquid stream has an incoming flow direction directed against and striking said actuator;
said incoming flow direction is parallel to said given actuation direction;
said actuator is upstream of and spaced from said inertial impactor collector;
said inertial impactor collector is downstream of and spaced from said actuator by an annular acceleration gap therebetween;

said inertial impactor collector concentrically surrounds said acceleration gap; and said acceleration gap concentrically surrounds said actuator.

45. The inertial gas-liquid impactor separator according to claim 44 wherein said actuation direction is transverse to said acceleration direction.

46. The inertial gas-liquid impactor separator according to claim 45 wherein movement of said actuator along said actuation direction varies only said second cumulative flow through said second set of one or more nozzles.

* * * * *